United States Patent
Kunishige

(10) Patent No.: US 8,890,993 B2
(45) Date of Patent: Nov. 18, 2014

(54) IMAGING DEVICE AND AF CONTROL METHOD

(75) Inventor: Keiji Kunishige, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 229 days.

(21) Appl. No.: 13/311,776

(22) Filed: Dec. 6, 2011

(65) Prior Publication Data

US 2012/0147252 A1    Jun. 14, 2012

(30) Foreign Application Priority Data

Dec. 10, 2010  (JP) ................................. P2010-275713

(51) Int. Cl.
| | | |
|---|---|---|
| G03B 13/00 | (2006.01) | |
| H04N 5/232 | (2006.01) | |
| H04N 5/228 | (2006.01) | |
| G06K 9/46 | (2006.01) | |
| G06K 9/66 | (2006.01) | |
| G06K 9/00 | (2006.01) | |
| H04N 5/225 | (2006.01) | |

(52) U.S. Cl.
CPC .......... *H04N 5/23219* (2013.01); *H04N 5/2256* (2013.01); *H04N 5/23245* (2013.01); *H04N 5/23212* (2013.01); *G06K 9/00228* (2013.01)
USPC ........................ 348/345; 348/208.12; 382/190

(58) Field of Classification Search
USPC ............ 348/208.12, 345–357, 78; 396/18, 51
See application file for complete search history.

(56) References Cited

U.S. PATENT DOCUMENTS

| | | | | |
|---|---|---|---|---|
| 7,382,901 | B2 * | 6/2008 | Wakamori | 382/117 |
| 7,456,874 | B1 * | 11/2008 | Ono | 348/239 |
| 7,660,519 | B2 * | 2/2010 | Iwane et al. | 396/123 |
| 7,668,451 | B2 * | 2/2010 | Misawa | 396/121 |
| 7,733,412 | B2 * | 6/2010 | Takayama | 348/349 |

(Continued)

FOREIGN PATENT DOCUMENTS

| | | |
|---|---|---|
| JP | 2001-215403 | 8/2001 |
| JP | 2005-128156 | 5/2005 |

(Continued)

OTHER PUBLICATIONS

Notice of Rejection from corresponding Chinese Patent Application Serial No. 201110406982.0, mailed Jan. 23, 2014 (13 pgs.).

(Continued)

*Primary Examiner* — Roberto Velez
*Assistant Examiner* — Pritham Prabhakher
(74) *Attorney, Agent, or Firm* — John C. Pokotylo; Straub & Pokotylo

(57) ABSTRACT

An imaging device of the present invention comprises a facial organ detection section for detecting facial organs within a face from an image that has been taken by an imaging section, an eye selection section for comparing sizes of eyes and selecting the largest eye, an eye size comparative determination section for comparatively determining the size of the eye with respect to a specified value, and an AF region setting section for setting an AF region in accordance with size and position of the selected eye when it has been determined that the size of the eye is larger than a specified value, and setting an AF region in accordance with position and size of a face to which the selected eye belongs when it has been determined that the size of the eye is smaller than a specified value.

8 Claims, 18 Drawing Sheets

(56) References Cited

U.S. PATENT DOCUMENTS

| | | | |
|---|---|---|---|
| 7,889,985 B2 | 2/2011 | Misawa | |
| 7,903,163 B2 * | 3/2011 | Ojima et al. | 348/333.02 |
| 8,102,440 B2 * | 1/2012 | Ono | 348/239 |
| 8,542,928 B2 * | 9/2013 | Kaneda et al. | 382/190 |
| 2003/0071908 A1 | 4/2003 | Sannoh | |
| 2004/0207743 A1 | 10/2004 | Nozaki | |
| 2005/0264758 A1 * | 12/2005 | Wakamori | 351/206 |
| 2007/0122036 A1 * | 5/2007 | Kaneda et al. | 382/190 |
| 2008/0181508 A1 * | 7/2008 | Kaneda et al. | 382/190 |
| 2008/0278587 A1 | 11/2008 | Izawa | |
| 2009/0046169 A1 * | 2/2009 | Ono | 348/222.1 |
| 2011/0122279 A1 * | 5/2011 | Kim | 348/222.1 |

FOREIGN PATENT DOCUMENTS

| | | |
|---|---|---|
| JP | 2010-054587 | 3/2010 |
| JP | 2010-109671 | 5/2010 |
| JP | 2010-186098 | 8/2010 |

OTHER PUBLICATIONS

Office Action from corresponding Japanese Patent Application Serial No. 2010-275713, mailed Sep. 11, 2014 (4 pgs.).

* cited by examiner

IMAGING DEVICE AND AF CONTROL METHOD

Benefit is claimed, under 35 U.S.C. §119, to the filing date of prior Japanese Patent Application No. 2010-275713 filed on Dec. 10, 2010. This application is expressly incorporated herein by reference. The scope of the present invention is not limited to any requirements of the specific embodiments described in the application.

BACKGROUND OF THE INVENTION

1. Field of the Invention

The present invention relates to an imaging device and an AF control method for a camera or the like that is capable, when a person is being photographed, of automatically focusing on the eyes of the person.

2. Description of the Related Art

With a conventional imaging device of a camera etc. an automatic focus adjustment unit is installed, and adjustment of a photographing lens is carried out automatically so as to focus on a subject. In recent years, it has become general practice to carry out face-priority AF, where a face within a subject is detected, and then focus adjustment is carried out so as to achieve the highest contrast at the position of the face.

However, with this face-priority AF, since focusing is carried out for the entire face, in a case where it is desired to focus on the eyes it is necessary to temporarily cancel face-priority AF, and manually focus on the eyes. There have therefore been various proposals for an automatic focusing unit that automatically focuses on the eyes, without canceling face-priority AF. For example, Japanese patent laid-open No. 2001-215403 (laid-open Aug. 10, 2001), Japanese patent laid-open No. 2005-128156 (laid-open May 19, 2005), Japanese patent laid-open No. 2010-054587 (laid-open Mar. 11, 2010), Japanese unexamined patent application No. 2010-186098 (Aug. 26, 2010), and Japanese unexamined patent application No. 2008-281733 (Nov. 20, 2008).

SUMMARY OF THE INVENTION

The present invention has as its objective to provide an imaging device that is capable of good focusing on the eyes, regardless of the size, position and number of people being photographed.

An imaging device of the present invention, capable of taking a digital image, comprises a facial organ detection section for detecting facial organs within a face from an image that has been taken by an imaging section, an eye selection section for comparing sizes of eyes that have been detected by the facial organ detection section and selecting the largest eye, an eye size comparative determination section for comparatively determining the size of the eye that has been selected by the eye selection section with respect to a specified value, an AF region setting section for setting an AF region in accordance with size and position of the selected eye when it has been determined by the eye size comparative determination section that the size of the eye is larger than a specified value, and setting an AF region in accordance with position and size of a face to which the selected eye belongs when it has been determined that the size of the eye is smaller than a specified value, and an AF processing section for carrying out an AF operation based on the AF region set by the AF region setting section.

An imaging device of the present invention, capable of taking a digital image, comprises a face detection section for detecting faces from an image that has been taken by an imaging section, a face selection section for comparing sizes of a plurality of faces that have been detected by the face detection section, and selecting the largest face, a facial organ detection section for detecting facial organs within a face from the image that has been taken by the imaging section, an eye size comparative determination section for comparatively determining the size of an eye, that has been detected by the facial organ detection section, of the face selected by the face selection section, with respect to a specified value, an AF area setting section for setting an AF region in accordance with size and position of a determined eye when where it has been determined by the eye size comparative determination section that the size of the eye is larger than a specified value, and setting an AF region in accordance with position and size of a selected face when it has been determined that the size of the eye is smaller than a specified value, and an AF processing section for carrying out an AF operation based on the AF region set by the AF area setting section.

An imaging device of the present invention, capable of taking a digital image, comprises a face detection section for detecting faces from an image that has been taken by an imaging section, a face selection section for comparing sizes of a plurality of faces that have been detected by the face detection section, and selecting the largest face, a face size comparative determination section for comparatively determining the size of the face that has been selected by the face selection section with respect to a specified value, a facial organ detection section for carrying out facial organ detection when it has been determined by the face size comparative determination section that the size of a face is larger than a specified value, an AF region setting section for setting an AF region in accordance with size and position of an eye that has been detected by the facial organ detection section when where it has been determined by the face size comparative determination section that the size of the face is larger than a specified value, and setting an AF region in accordance with position and size of a selected face when it has been determined that the size of the face is smaller than a specified value, and an AF processing section for carrying out an AF operation based on the AF region set by the AF region setting section.

An AF control method of the present invention for an imaging device having an imaging section capable of taking a digital image, comprises detecting an eye within a face from an image that has been taken by the imaging section, comparing sizes of a plurality of detected eyes and selecting the largest eye, comparing size of a selected eye having the largest size with a specified value, setting an AF region in accordance with size and position of the selected eye when it has been determined that the size of the eye is larger than a specified value, and setting an AF region in accordance with position and size of a face to which the selected eye belongs when it has been determined that the size of the eye is smaller than a specified value, and carrying out an AF operation based on the AF region that has been set.

An AF control method of the present invention for an imaging device having an imaging section capable of taking a digital image comprises detecting faces from an image that has been taken by the imaging section, comparing sizes of a plurality of detected faces, and selecting the largest face, detecting an eye of a face from an image that has been taken by the imaging section, comparing size of the detected eye with a specified value, setting an AF region in accordance with size and position of the determined eye when it has been determined that the size of the detected eye is larger than a specified value, and setting an AF region in accordance with position and size of a face in which the determined eye is located when it has been determined that the size of the determined eye is smaller than a specified value, and carrying out an AF operation based on the AF region that has been set.

An AF control method of the present invention for an imaging device having an imaging section capable of taking a digital image, comprises selecting a largest face, comparing size of the selected largest face with a specified value, when it has been determined that the size of the largest face is larger than a specified value, detecting eyes within the largest face from an image taken by the imaging section and setting an AF region in accordance with size and position of the selected eyes, and, when it has been determined that the size of the largest face is smaller than a specified value, setting an AF region in accordance with position and size of the selected largest face, and carrying out an AF operation based on the AF region that has been set.

DETAILED DESCRIPTION OF THE PREFERRED EMBODIMENTS

Preferred embodiments using a camera to which the present invention has been applied will be described in the following in accordance with the drawings. A camera of one preferred embodiment of the present invention is a digital camera having an imaging section, with a subject image being converted to image data by this imaging section, and the subject image then being subjected to live view display on a display section 115 arranged on a rear surface based on this converted image data. A photographer determines composition and photo opportunity by looking at the live view display. At the time of a 1st release, if a person is included in a subject, automatic focus adjustment is carried out for a photographing lens so as to focus on the eyes or face of a person. At the time of a 2nd release image data is stored to a storage medium (external memory 114). Image data that has been stored in the storage medium can be played back and displayed on the display section if playback mode is selected.

Figure 1:
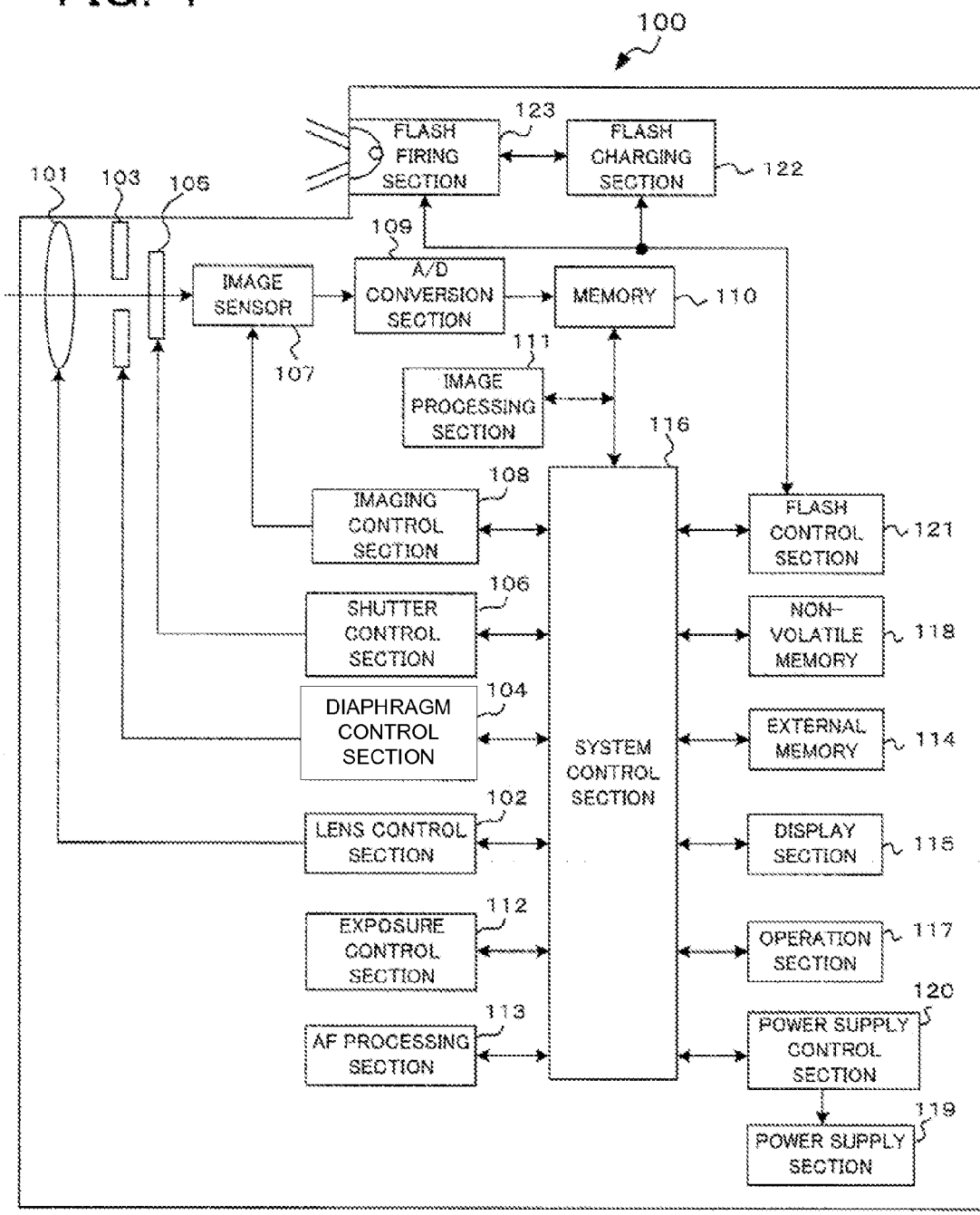
FIG. 1 is a block diagram mainly showing the electrical structure of a camera of one embodiment of the present invention.

FIG. 1 is a block diagram mainly showing the electrical structure of a camera 100 of one embodiment of the present invention. A diaphragm mechanism 103, shutter 105 and image sensor 107 are arranged on the optical axis of a photographing lens 101. Output of the image sensor 107 is connected to an A/D converter section 109, and output of the A/D converter section 109 is connected to a memory 110. The memory 110 is connected to an image processing section 111 and a system control section 116.

An imaging control section 108, shutter control section 106, diaphragm control section 104, lens control section 102, exposure control section 112, AF processing section 113, flash control section 121, non-volatile memory 118, external memory 114, display section 115, operation section 117 and power supply control section 120 are respectively connected to the system control section 116. The above described imaging control section 108 is connected to the image sensor 107, the shutter control section 106 is connected to the shutter 105, the diaphragm control section 104 is connected to the diaphragm 103, and the lens control section 102 is connected to the photographing lens 101. Also, the power supply control section 120 is connected to a power supply section 119, and the flash control section 121 is respectively connected to a flash charging section 122 and a flash firing section 123.

The photographing lens 101 is an optical system for concentrating subject light flux onto the image sensor 107, to form a subject image. This photographing lens 101 has its focus state varied by being moved in the optical axis direction by the lens control section 102 that operates in response to commands from the system control section 116. The diaphragm mechanism 103 adjusts an amount of incident light of the subject light flux that is to be incident on the image sensor 107 through the photographing lens 101. The diaphragm mechanism 103 has its opening amount controlled by the diaphragm control section 104 that operates in response to instructions from the system control section 116.

The shutter 105 performs opening and closing for light flux of a subject image formed by the photographing lens 101, and is constructed using a well-known lens shutter or focal plane shutter etc. The shutter 105 has its open time (shutter speed value) controlled by the shutter control section 106 that operates in response to instructions from the system control section 116.

The image sensor 107 that functions as an imaging section is a two-dimensional image sensor such as a CMOS image sensor or a CCD image sensor, and comprises Bayer array color filters arranged on a front surface, and photoelectric conversion elements such as photodiodes arranged in correspondence with the color filters. An image region is constituted by pixel groups made up of each color filter and its corresponding photoelectric conversion element. The image sensor 107 receives light that has been focused by the photographing lens 101 at each pixel and performs photoelectric conversion, stores this photoelectric current in a condenser, and outputs to the A/D converter section 109 as an analog voltage signal (image signal). The imaging control section 108 that functions as an imaging section carries out operational control of the image sensor 107 in response to instructions from the system control section 116.

The A/D converter section 109 converts an analog voltage signal (image signal) output from the image sensor 107 into a digital image signal (image data). The memory 110 is a storage section for temporarily storing various data, such as image data acquired in the A/D converter section 109 and image data that has been subjected to processing by the image processing section 111. In this specification, as long as a signal is based on an image signal output from the image sensor 107 it will be referred to as image data, and this includes image processed signals, not only a signal that has been subjected to A/D conversion by the A/D converter section 109.

The image processing section 111 reads out image data that has been temporarily stored in the memory 110, and carries out image processing such as white balance correction processing, demosaicing processing and color conversion processing on this image data. Also, the image processing section 111 functions as a face detection section, and detects faces within a subject based on image data. The image processing section 111 also acts as a facial organ detection section, and performs detection of organs within a face such as eyes, nose and mouth. Here, in the case here organs such as eyes are detected, the position and size of the eyes are also detected, and turning of the face is also detected based on the position etc. of these organs. The image processing section 111 also carries out image compression at the time of storage in the external memory 114, which will be described later, and expansion of compressed image data that has been read out from the external memory 114.

The exposure control section 112 calculates subject brightness (brightness of a scene containing the subject) using image data temporarily stored in the memory 110. There is obviously no problem in calculating subject brightness using a dedicated photosensor.

The AF (Auto Focus) processing section 113 extracts signals for high frequency components from image data temporarily stored in the memory 110, and acquires a contrast value using integration processing. The system control section 116 carries out drive control so as to bring the photographing lens 101 to its focused position, by means of the lens control section 102, based on the contrast value. In obtaining the contrast value, while it possible to obtain a value for the entire screen, it is also possible to obtain a contrast value based on image data corresponding to an AF region that has been set by an AF region setting section. The AF processing section 113 can also be provided with a dedicated sensor, such as a TTL phase difference AF sensor, to obtain an out-of-focus amount of the photographing lens 101 based on output of this dedicated sensor.

The system control section 116 is constituted by an ASIC (Application Specific Integrated Circuit) including a CPU (Central Processing Unit), and performs unified control of various sequences of the camera 100, such as the imaging control section 108 and the flash control section 121. The system control section 116 also functions as an eye selection section for comparing sizes of eyes that have been detected by the image processing section 111 that functions as a facial organ detection section and selecting an eye of the largest size, an eye size comparative determination section for comparatively determining the size of the largest eye with respect to a specified value, and a face size comparative determination section for comparatively determining the size of a face with respect to a specified value. The system control section 116 also functions as an AF region setting section for setting an AF region in which to perform focusing depending on the position or size of an eye or face.

Figure 2:
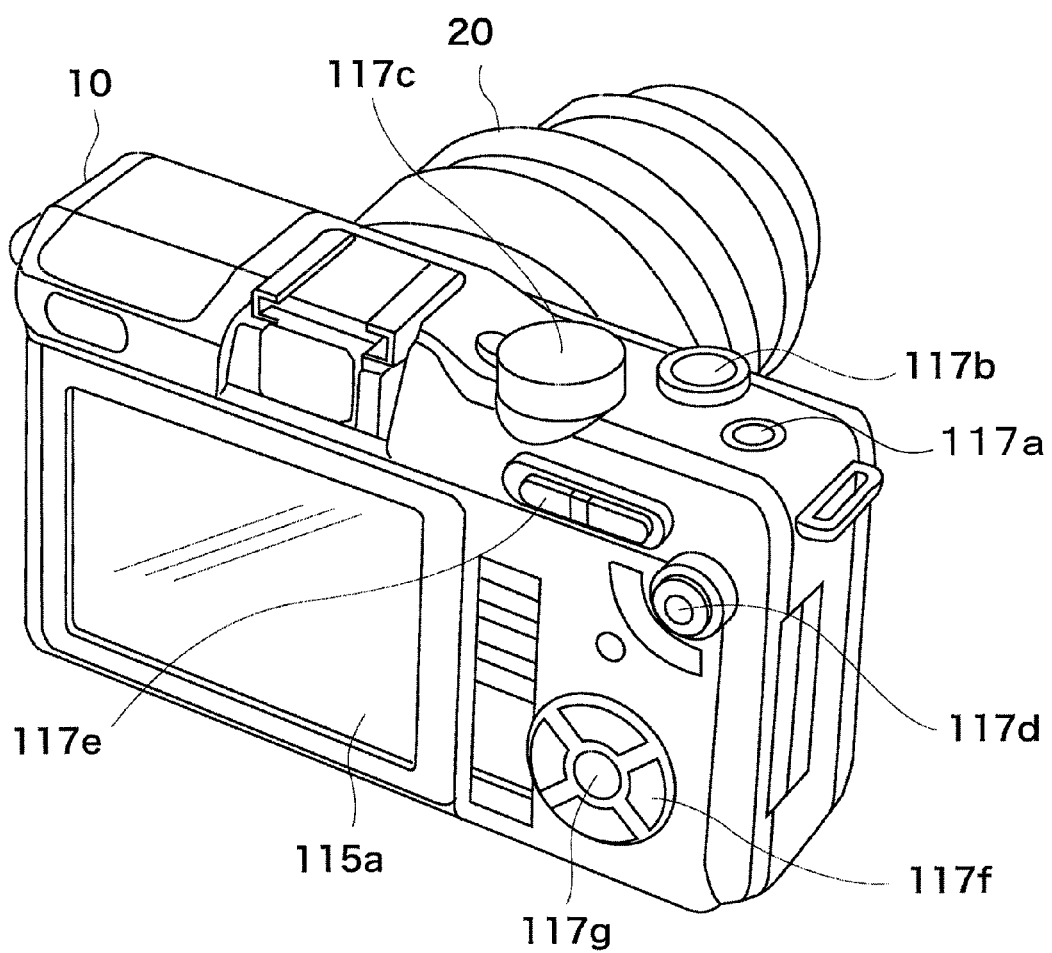
FIG. 2 is an external perspective drawing looking from a rear surface of a camera of one embodiment of the present invention.

The operation section 117 includes operation members, such as a power supply button 117a, a release button 117b, a shooting mode dial 117c, a movie button 117d, a function button 117e, a cross-shaped button 117f, an OK button 117g, a menu button and various input keys, as shown in FIG. 2. If a user operates any of the operation members of the operation section 117, the system control section 116 executes various sequences according to the user operation.

The power supply button 117a within the operation section 117 is an operation member for instructing to turn a power supply of the camera 100 on or off, and if the power supply button 117a is pressed the power supply of the system control section 116 is turned on, while if it is pressed again the power supply is turned off. The release button 117b has a two-stage switch with a first release switch and a second release switch. If the release button 117b is pressed down halfway, the first release switch is turned on, and if the release button is pressed down further from the halfway point to a fully pressed state the second release switch is turned on. If the first release switch is turned on, the system control section 116 executes shooting preparation sequences such as AE processing and AF processing. Also, if the second release switch is turned on, the system control section 116 executes a shooting sequence for still pictures and takes a picture.

The movie button 117d within the operation section 117 is a button for instructing to start and stop movie shooting. The shooting mode dial 117c is a dial for setting auto mode, aperture priority mode, shutter speed priority mode, etc.

The external memory 114 is, for example, a storage medium that is inserted into and taken out of the camera body, and stores image data that has been compressed in the image processing section 111, and its associated data. Image data that has been stored is also read out and playback displayed on the display section 115. A storage medium for storing image data etc. is not limited to one that is inserted into or removed from the camera body, and can be a storage medium such as a hard disk built in to the camera body.

The display section 115 includes a liquid crystal monitor or organic EL 115a (refer to FIG. 2) or the like arranged on a rear surface of the camera body or the like, and live view display is carried out based on image data. The display section 115 also carries out playback display of taken images that have been stored in the external memory 114, and carries out display of menu screens for setting such as exposure control values or display and shooting modes etc. With this embodiment, the display section 115 functions as a display section for displaying the position of an eye that has been focused on by the AF processing section. The display section is not limited to a liquid crystal monitor, and can be a display such as an organic EL as long as it is able to display images etc.

The non-volatile memory 118 is an electrically rewritable non-volatile memory, and stores various parameters that are required for operation of the camera 100. The non-volatile memory 118 also stores programs executed by the system control section 116. The system control section 116 executes various sequences in accordance with programs stored in the non-volatile memory 118 and the reading out of parameters stored in the non-volatile memory 118.

The power supply section 119 supplies power necessary for operation of each section of the camera 100, and is constituted by, for example, a power supply battery such as a secondary cell. The power supply control section 120 performs control of the power supply section 119, such as detecting power supply voltage and remaining capacity of the battery constituting the power supply section 119.

The flash control section 121 controls a charging operation of the flash charging section 122, and a firing operation of the flash firing section 123, in accordance with instructions from the system control section 116. The flash charging section 122 comprises a boost circuit for boosting the power supply voltage of the power supply section 119, and a capacitor for holding energy at the voltage boosted by the boost circuit, and holds the energy required to fire the flash firing section 123. The flash firing section 123 is provided with an arc tube such as a xenon (Xe) tube for example, and a reflecting hood, and fires using the energy held in the capacitor of the flash charging section 122 when a firing instructing is received from the flash control section 121.

Next, external appearance of the camera 100 of this embodiment will be described using FIG. 2. FIG. 2 is an external perspective drawing of the camera 100 looking from the rear surface, and shows an interchangeable lens 20 fitted to the camera body 10. The power supply button 117*a*, release button 117*b* and shooting mode dial 117*c* are arranged on an upper surface of the camera body 10.

Also, a liquid crystal monitor 115*a* is arranged on the rear surface of the camera body 10, and various displays such as live view display of a subject image or menu screen display playback display of a stored image etc. are carried out using this liquid crystal monitor 115*a*. The movie button 117*d* and function button 117*e* are arranged on an upper right side of the rear surface of the camera body 10, and the cross-shaped button 117*f* and the OK button 117*g* are arranged below these buttons. The cross-shaped button 117*f* causes a cursor to move on the screen, on menu screens or the like displayed on the liquid crystal monitor 115*a*, and it is possible to confirm items selected using the cursor if the OK button 117*g* is pressed down. The OK button 117*g* functions as a switch section for instructing between an eye displayed by the display section and an opposite eye.

Figure 3:
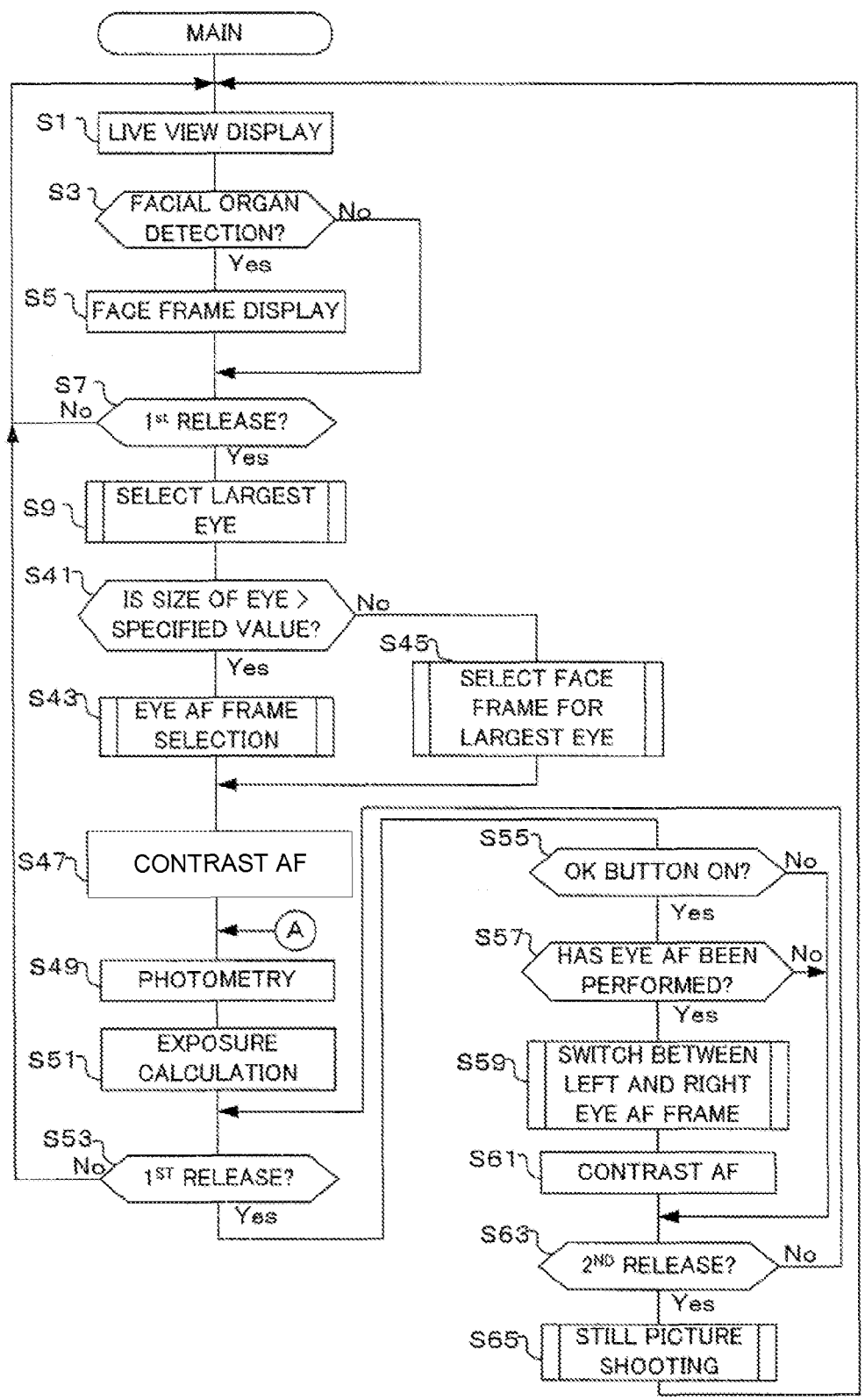
FIG. 3 is a flowchart showing main operation of the camera of one embodiment of the present invention.

Next, camera control operations of the camera 10 of this embodiment will be described using the flowchart shown in FIG. 3. This processing flow, and respective processing flows that will be described later, are executed by the system control section 116 in accordance with programs stored in the non-volatile memory 118. The processing flow shown in FIG. 3 is the main routine. Execution of this main routine commences once the power supply button 117*a* of the operation section 117 is turned on.

If operation of the main routine commences, live view is first carried out (S1). With the live view display, image signals output from the image sensor 107 are subjected to image processing for live view display by the image processing section 111, and this image processed image data is displayed on the liquid crystal monitor 115*a* of the display section 115. The photographer determines composition of a still picture or movie by looking at this live view display, and determines when to press the release button.

If live view display is carried out, it is next determined whether or nor a facial organ could be detected (S3). In this step it is determined whether or not the image processing section 111 was able to detect facial organs, namely eyes, nose mouth etc., of a face of a person within a subject based on image data from the image sensor 107.

If the result of determination in step S3 is that it was possible to detect a facial organ, a face frame is displayed (S5). As shown, for example, in FIG. 6A and FIG. 6B, display of this face frame is carried out by overlaying a white frame showing part of the face of the subject, such as the face frames 30*a*, 31*a*-31*d*, on the subject image displayed on the liquid crystal monitor 115*a*. The face frame is not limited to a white frame, and another display method is possible providing part of a face is displayed.

Once display of the face frame has been carried out in step S5, or if the result of determination in step S3 was that a facial organ could not be detected, it is next determined whether or not a 1st release operation has been performed (S7). Here it is determined whether or not the release button 117*b* of the operation section 117 has been pressed down halfway. If the result of this determination is that the 1st release operation has not been performed, processing returns to step S1, and live view display etc. is executed.

Figure 6A:
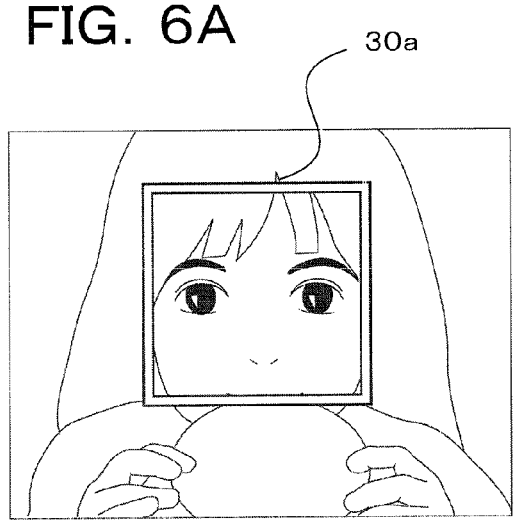
FIG. 6A and FIG. 6B are drawings showing frames for a face when eyes have been detected, with the camera of one embodiment of the present invention.
Figure 6B:
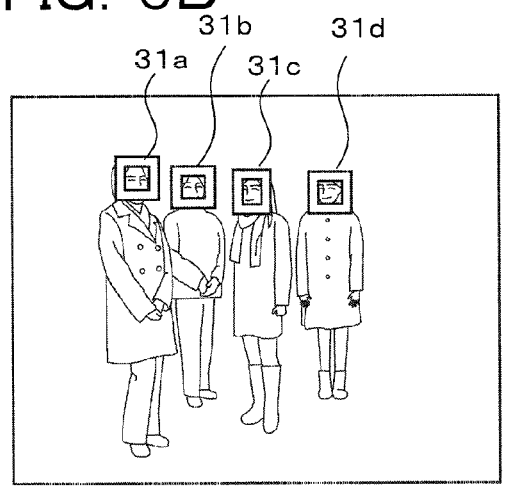

If the result of determination in step S7 is that 1st release operation has been carried out, the largest eye is selected (S9). Since the 1st release operation has been carried out, in step S9 and after focusing on an eye portion of the subject is carried out together with metering centering on a face portion, and exposure control values are determined. First, in step S9, the largest eye is selected from among eyes of the facial organs that were detected in step S3. As shown in FIG. 6A, in a case where there is a single person and both eyes are detected, the largest eye of the left eye or the right eye is selected. Also, as shown in FIG. 6B, in the case where there are a plurality of people, the largest eye from among the eyes of the plurality of people is selected.

Figure 8A:
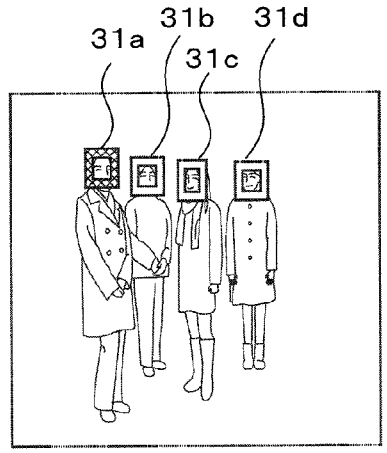
FIG. 8A and FIG. 8B are drawings showing selection of an AF frame when a plurality of faces have been detected, and when an eye is larger than a specified value, with the camera of one embodiment of the present invention.
Figure 8B:
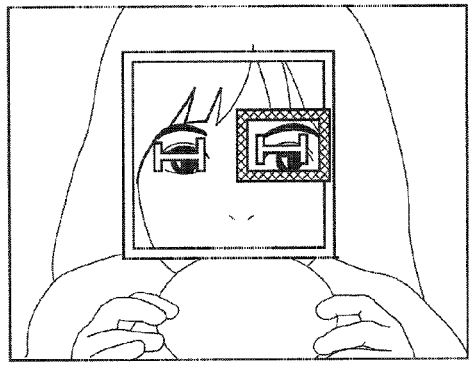

Once the largest eye has been selected in step S9, it is next determined whether or not the size of the eye is larger than the specified value (S41). Here, it is determined whether or not the largest eye that was selected in step S9 is larger than the specified value. For example, it is possible to make the size of the eye a distance between the lateral canthus and the medial canthus, as shown in FIG. 8B. The size of the eye can also be based on the diameter of the iris (pupil).

As the specified value in step S41, it is possible to use a value such that variation in focus, namely a Bokeh state, correspond to a distance of the depth of a face (about 10 cm), becomes large, as a fixed value. Also, since the out of focus Bokeh state varies depending on lens focal length, distance from the camera to the face, and aperture value etc., it is also possible to determine the specified value by calculation based on these values instead of using a fixed value.

If the result of determination in step S41 is that the size of the eye is larger than the specified value, an eye AF frame is next selected (S43). Since the size of the eye is larger than the specified value, in this step eye AF frame setting is carried out so that focus is achieved at the eye portion. From a practical viewpoint, the above described specified value can be set to a value such that it is possible to detect whether or not the eye AF frame is the same size or larger than a face in a head and shoulders type photograph, so that the eye AF frame does not become too small. Also, at the time of displaying the eye AF frame, it is possible to change the aspect ratio of the eye AF frame and a face AF frame. Detailed operation of this eye AF frame setting will be described later using FIG. 9 to FIG. 20.

On the other hand, if the result of determination in step S41 is that the size of the eye is smaller than the specified value, a face AF frame for the face of the largest eye is selected (S45). If the eye portion is smaller than the specified value, focusing on the eye will be difficult. The AS frame is therefore set for the face of the largest eye that was selected in step S9. For example, as shown in FIG. 6B, in the case where a plurality of face frames 31a-31d have been selected, the face frame including the largest eye is selected.

Once an eye AF frame or a face frame has been selected in step S43 or step S45, contrast AF is next carried out (S47). Here, a contrast value obtained by the AF processing section 113 integrating high frequency components of image data is acquired using image data within the eye AF frame or the face frame that was selected in step S43 or S45. The system control section 116 carries out focus adjustment control to move the photographing lens 101, by means of the lens control section 102, so that the contrast value becomes a peak value.

Once contrast AF has been carried out, photometry is carried out (S49). Here, subject brightness is obtained using image data for a portion in which an eye AF frame or a face frame has been selected. Since there are also situations where it is desired to obtain correct exposure for an entire face, even in the case where an eye AF frame has been selected, it is also possible to obtain, as a photometry value, subject brightness using image data for a portion of a face frame of a face in which an eye AF frame has been selected.

Once photometry has been carried out, exposure calculation is carried out (S51). Using the subject brightness that was obtained in step S49, the system control section 116 calculates exposure control values such as shutter speed, aperture value, ISO sensitivity etc. to obtain correct exposure, by means of APEX calculation or table reference.

Once exposure calculation has been carried out, it is next determined whether or not the 1st release operation is continuing. If the release button 117b is pressed down half way in step S7, processing advances to step S9 and after, but whether or not the half pressing of the release button 117b is continuing is also determined at the time of determination in step S53. If the result of this determination is that the 1st release operation is not continuing, processing returns to step S1 as this means that a finger has been taken off the release button 117b.

If the result of determination in step S53 is that the 1st release operation is continuing, it is next determined whether or not the OK button 117g is on (S55). In processing prior to step S53, focusing is carried out for a portion of a subject inside an automatically selected eye AF frame or face frame. However, there are cases where it is desired to carry out focusing with the user switching the automatically set eye AF frame. In steps S56-S61, therefore, it is made possible to manually switch the eye AF frame. In this case, since the user operates the OK button 117g, it is determined in this step whether or not the OK button 117G is on. With this embodiment, switching of the eye AF frame has been carried out using operation of the OK button 117g, but this is not limiting and can be carried out using a method such as providing a touch sensor on the screen of the liquid crystal monitor 115a and touching the position of an eye, or using another operation member.

If the result of determination in step S55 is that the OK button 117g is on, it is next determined whether or not an eye AF frame has been selected (S57). Here it is determined whether or not it was possible to select an eye AF frame in step S43.

Figure 7A:
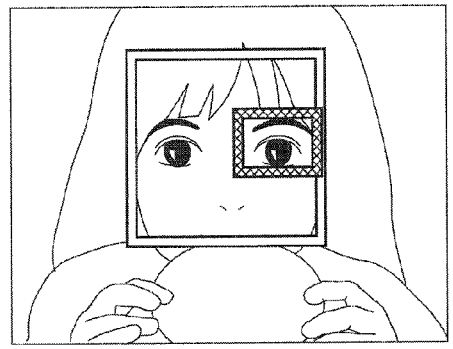
FIG. 7A and FIG. 7B are drawings showing switching of eye AF frames, with the camera of one embodiment of the present invention.
Figure 7B:
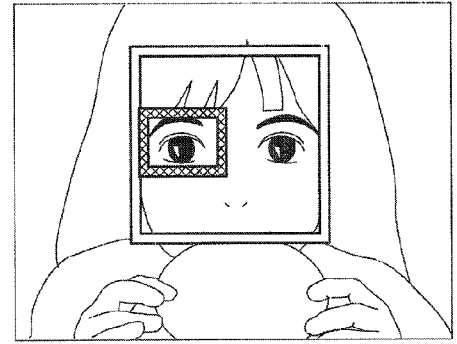

If the result of determination in step S57 is that an eye AF frame was selected, eye AF frame lateral switching is next carried out (S59). Here, the eye AF frame that is currently set is switched to the other eye AF frame. Specifically, if the eye AF frame is currently set on the right eye, from the observer's viewpoint, as shown in FIG. 7A, the eye AF frame is switched to the left eye, as shown in FIG. 73. On the other hand, if the eye AF frame is set on the left eye, from the observer's viewpoint, as shown in FIG. 7B, the eye AF frame is switched to the right eye, as shown in FIG. 7A.

If lateral switching of the eye AF frame has been carried out in step S59, contrast AF is carried out (S61). Here, focus of the photographing lens 101 is carried out using contrast AF for the laterally switched eye AF frame.

Once the contrast AF has been carried out in step S61, if the result of the termination in step S55 was that the OK button was not on, or if the result of determination in step S57 with that an eye AF frame was not selected, it is next determined whether or not a 2 nd release operation has been performed (S63). Here it is determined whether or not the release button 117b within the operation section 117 has been pressed down fully. If the result of this determination is that there has not been a 2 nd release operation, processing returns to step S53.

On the other hand, if the result of the determination in step S63 is that a second release operation was performed, still picture shooting is carried out (S65). Here, still picture image data that has been acquired by the image sensor 107 is stored in the external memory 114 after image processing by the image processing section 111. Once still picture shooting is completed, processing returns to step S1.

In this way, in the main routine of one embodiment of the present invention, an AF region is set in accordance with size and position of the selected eye when it has been determined that the size of the eye is larger than a specified value (Yes in S41) (S43), while an AF region is set in accordance with position and size of a face to which the selected eye belongs when it has been determined that the size of the eye is smaller than a specified value (S45). It is therefore made possible to achieve good focus on an eye regardless of the size or position of a person being photographed.

Next, a first modification to the main flow of this embodiment will be described using FIG. 4. In the embodiment that was shown in FIG. 3, facial organ detection was carried out and an AF frame for an eye that was detected as a result of the facial can detection was selected. Differing from this, with the first modified example, face detection is first carried out, and selection of an eye AF frame within the largest face among faces that have been detected is carried out.

Figure 4:
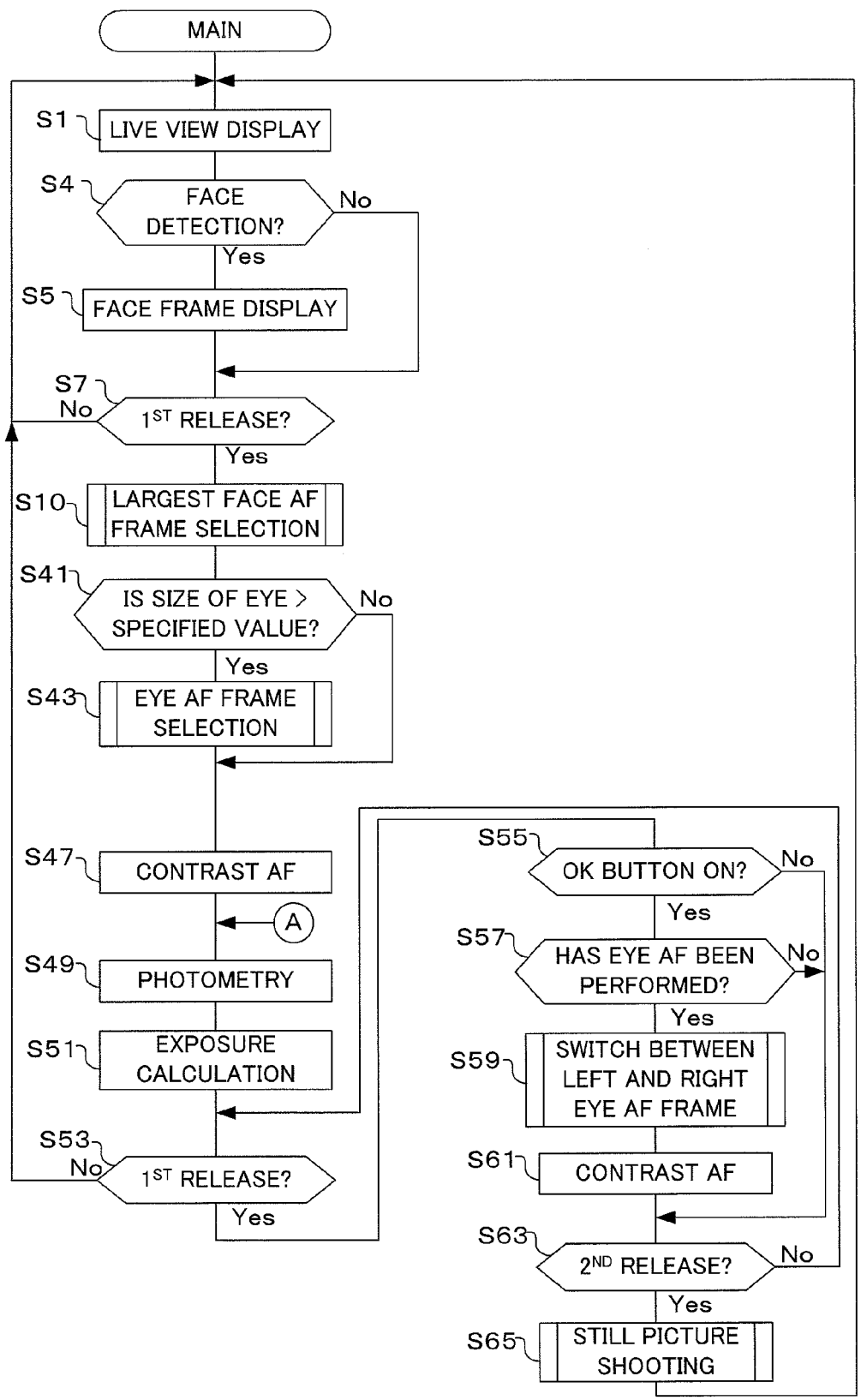
FIG. 4 is a flowchart showing a first modified example of main operation of the camera of one embodiment of the present invention.

Comparing the main flow of the first modified example shown in FIG. 4 and the main flow shown in FIG. 3, with the first modified example the "facial organ detection" of step S3 is replaced by the "face detection" of step S4, the "selection of largest eye" of step S9 is replaced by "largest face AF frame selection" of step S10, and the "selection of face AF frame for largest eye" of step S45 is omitted. Accordingly, description will center on these points of difference, and steps carrying out the same processing have the same reference numbers attached, and detailed description thereof is omitted.

Once the main flow shown in FIG. 4 is entered and live view display is carried out (S1), face detection is next carried out (S4). In this step, the image processing section 111 detects whether a face is contained in the subject image by various methods such as a matching method or face color etc., using image data. If the result of this determination is that it has been possible to carryout face detection, face frame display is next carried out (S5). Here, a face frame is displayed as was described using FIG. 6A and FIG. 6B.

Once face frame display has been carried out, it is determined whether or not a 1st release operation has been carried out (S7), and if the result of this determination is that a 1st release operation has been performed, selection of the largest face AF frame is carried out (S10). Here, the largest face from among faces that have been detected in the face detection of step S4 is selected, and a face AF frame is superimposed on the portion of this face in the subject image. For example, as shown in FIG. 8A, in the case where a priority of face frames 31a-31d have been detected, a face AF frame corresponding to the largest face from among the detected faces is selected as the largest face AF frame. In order to be able to differentiate the selected face frame 31a as the largest face AF frame, it is preferable to make it identifiable by changing the color of the frame etc.

Once the largest face AF frame has been selected in step S10, it is determined whether or not the size of the eye is larger than the specified value (S41). With the one embodiment of the present invention, all eyes of people within the subject are detected and the largest eye is determined from among these, but with this modified example, the size of the largest eye within the face corresponding to the face AF frame that was selected as the largest face AF frame in step S10 is determined.

If the size of the eye is larger than the specified value, eye AF frame selection is carried out (S43), and once this eye AF frame selection has been carried out contrast AF is carried out (S47). In the one embodiment of the present invention if the size of the eye is smaller than the specified value of face frame of the largest eye is selected, but with this modified example this step is omitted and contrast AF is carried out. This is because if the eye is smaller than the specified value, it is sufficient as long as contrast AF is carried out based on image data of the largest face AF frame that was selected in step S10.

Since the processing in each of the steps S47 and afterward is the same as the flow of the one embodiment shown in FIG. 3, detailed description will be omitted.

In this way, in the first modified example of the main flow, first of all face detection is carried out, the largest face from among those detected faces is detected, and if an eye within this largest face is larger than the specified value AF is carried out for an eye AF frame, while if the eye is smaller than the specified value AF is carried out for the largest face AF frame. Specifically, an AF region is set in accordance with size and position of the selected eye (S43) when it has been determined that the size of the eye is larger than a specified value (S41), while an AF region is set in accordance with position and size of a selected face (S10) when it has been determined that the size of the eye is smaller than a specified value. It is therefore made possible to rapidly achieve good focus on an eye regardless of the size or position of a person being photographed, or the number of people being photographed.

Next, a second modification of the main flow of this embodiment will be described using FIG. 5. In the embodiment that was shown in FIG. 3, facial organ detection was carried out, while in the first modified example face detection was carried out, and AF frame selection was carried out. Differing from both of these, in the second modified example face detection is first carried out, next facial organ detection is carried out, and a left eye or right eye is selected as an AF frame.

Figure 5:
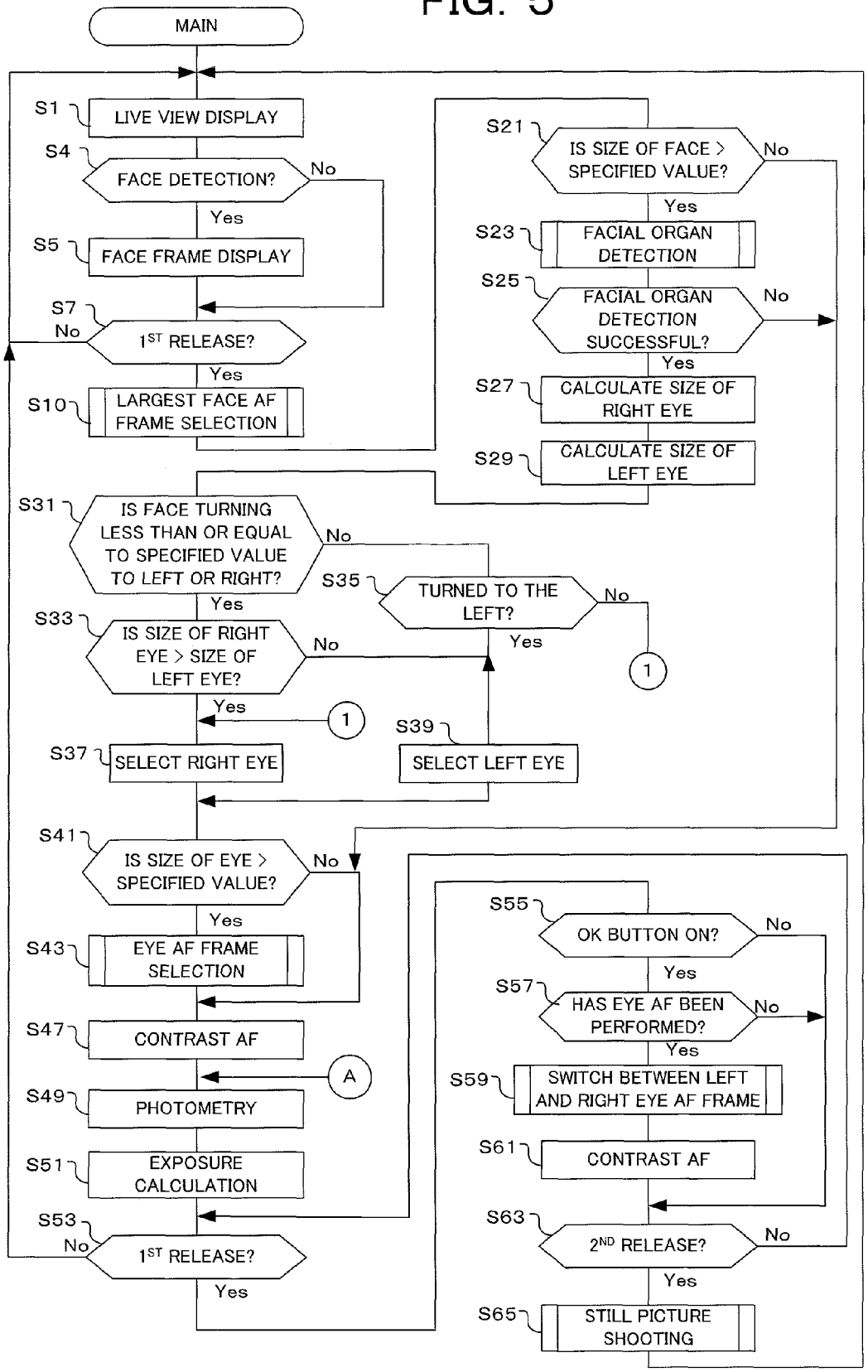
FIG. 5 is a flowchart showing a second modified example of main operation of the camera of one embodiment of the present invention.

Comparing the main flow of the second modified example shown in FIG. 5 and the main flow shown in FIG. 4, a point of difference is that steps S21 to S39 are added between steps S10 and S41 of the first modified example. Accordingly, description will center on these points of difference, and steps carrying out the same processing have the same reference numbers attached, and detailed description thereof is omitted.

Once the main flow shown in FIG. 5 is entered and the largest face AF frame has been selected in step S10, it is next determined whether or not the size of the face is larger than the specified value (S21). Here, determination is carried out based on the size of the face that was detected in step S10. With this embodiment, in the case where processing for facial organ detection and processing for face detection are carried out separately, they are only executed in the case where the size of the face is greater than the specified value, in order to shorten processing time related to AF. For example, this is effective in cases where it is possible to expect comparatively high speed detection compared to facial organ detection for eyes, nose, mouth etc., such as a case of carrying out face detection by detection using face color etc., or a case of carrying out face detection by pattern matching.

If the result of determination in step S21 is that the size of the face is larger than the specified value, organ detection is carried out (S23). Here, the image processing section 111 detects organs such as eyes within the largest face AF frame that was selected in step S10. In carrying out organ detection, with the method for detecting black portions (pupil) or white portions of the eye is not possible to detect an eye if it is inadvertently closed. In this case, NO is determined in the next step S25, and AF is carried out using a face AF frame. On the other hand, with a method that detects an eye based on the distance between the lateral canthus and the medial canthus, as was described using FIG. 8B, since detection is possible even if an eye is closed, this type of eye detection is preferred.

Once organ detection has been carried out in step S23, it is next determined whether or not this organ detection has been successful (S25). If the result of this determination is the organ detection was successful, then next the size of the right eye is calculated (S27), and the size of the left eye is calculated (S29). The sizes of the left and right eyes are calculated by the image processing section 111 obtaining a distance between the lateral canthus and the medial canthus.

Once the sizes of the left and right eyes have been calculated, is next determined whether the direction in which the face is turned is less than or equal to a specified lateral value (S31). Turning of the face is determined based on positional relationships such as between both eyes and the nose or the mouth. Also, as the specified value, it is possible to have a value that would be termed "turned slightly forward", such as about 16 degrees.

If the result of determination in step S31 is that the turning of the face is not less than or equal to the specified lateral value, it is next determined whether or not the turning of the face is to the left (S35). If the turning angle of the face exceeds the specified value (for example 16°) then taking into consideration that there are many cases where the eye that is furthest away is undetectable, or the detection accuracy in a state that is close to being undetectable is low, one of the left and right eyes is selected depending on the turning direction. For this reason, if the result of determination in step S35 is that the face is turned to the left, the left eye is selected (S39), while if the face is not turned to the left the right eye is selected (S37).

On the other hand, if the result of determination in step S31 is that the turning of the face is less than or equal to the specified value, it is next determined whether or not the size of the right eye is larger than the size of the left eye. (S33). If turning angle of the face is less than or equal to the specified value, detection accuracy of face turning is low, but taking into consideration the fact that detection accuracy for eye size is high one of the left or right eyes is selected based on eye size. If the result of determination in step S33 is that the size of the right eye is larger than the size of the left eye, the right eye is selected (S37), while if the size of the right eye is not larger than the size of the left eye and the left eye is selected (S39).

If selection of the left eye or the right eye has been carried out in step S37 or S39, it is next determined whether or not the selected eye is larger than a specified value (S41). The specified value is set sufficiently large in consideration the fact that there are variations in eye size depending on the size of the face for which organ detection was carried out, and on the turning of the face (up and down and to the left and right). If the fact that accuracy of eye AF may be lowered in accordance with the eye size is conceded, then this determination routine can be omitted.

If the result of determination in step S41 is that the size of the eye is larger than the specified value, an eye AF frame is set (S43). If an eye AF frame is set, if the result of determination in step S41 is that the size of the eye is larger than the specified value, if the result of determination in step S21 is that the size of the face is not greater than the specified value, or if the result of determination in step S25 is that organ detection was not achieved, contrast AF is carried out (S47). Since the processing in steps S47 and afterward is the same as the flow of the one embodiment and the first modified example, detailed description will be omitted.

In this second modified example of the main flow, after face detection has been carried out eyes of the largest face are detected, and an AF frame is set for either the left or right eye depending on the turning direction of the face. Also, if the turning of the face is less than or equal to a specified angle the AF frame is set based on the size of the eye. Specifically, an AF region is set in accordance with size and position of the selected eye (S43) when it has been determined that the size of the eye is larger than a specified value (S41), while an AF region is set in accordance with position and size of a selected face (S10) when it has been determined that the size of the eye is smaller than a specified value. Also, an AF region is set in accordance with size and position of the selected eye when it has been determined that the size of the face is larger than a specified value (S21 Yes), while an AF region is set in accordance with position and size of the selected face when it has been determined that the size of the face is smaller than a specified value (S21 No) (S10). It is therefore made possible to rapidly achieve good focus on an eye regardless of the size or position of a person being photographed, or the number of people being photographed or the face being turned.

Figure 9:
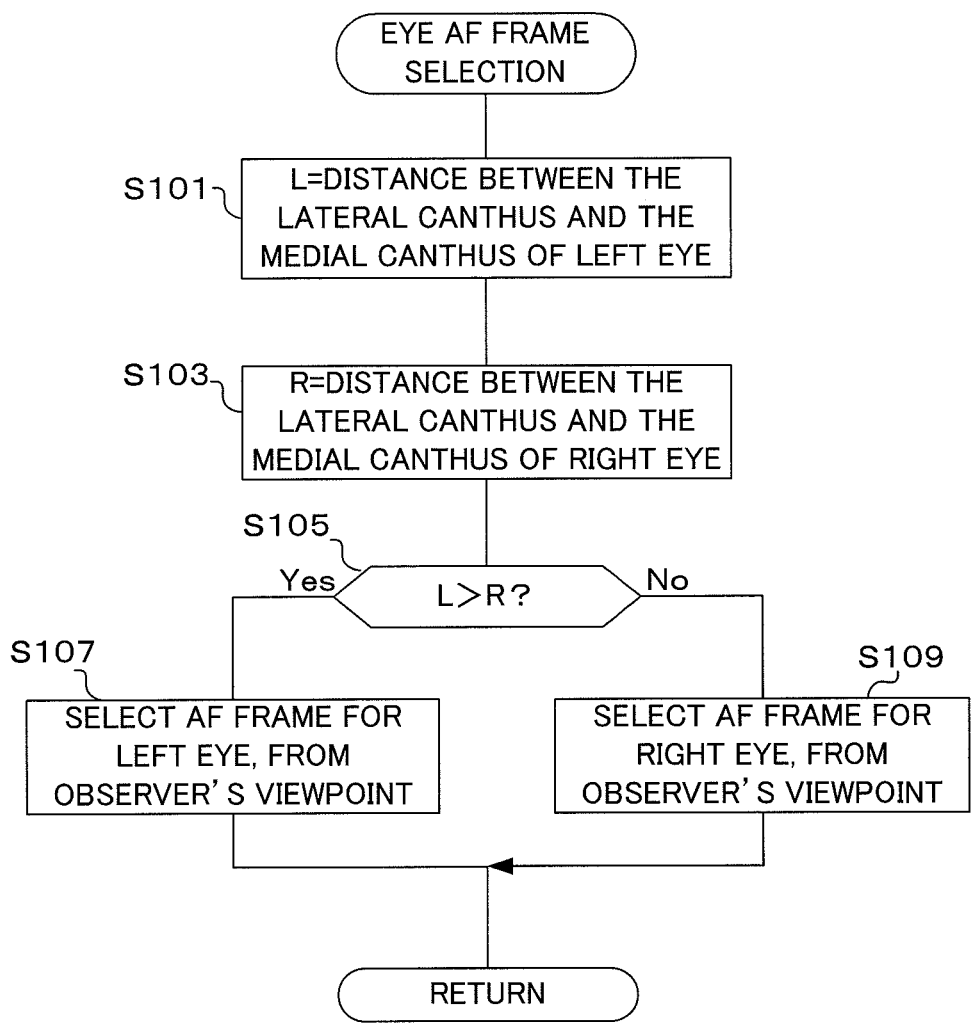
FIG. 9 is a flowchart showing an eye AF frame selection operation of the camera of one embodiment of the present invention.

Next, the eye AF frame selection of step S43 of the main flow shown in FIG. 3 to FIG. 5 will be described using FIG. 9 and FIG. 10. If the eye AF frame selection flow shown in FIG. 9 is entered, first of all a distance between the lateral canthus and the medial canthus of the left eye, from the observer's viewpoint, is set to L (S101), while the distance between the lateral canthus and the medial canthus of the right eye, from the observer's viewpoint, is set to R (S103). Here the position of the lateral canthus and position of the medial canthus are detected by the image processing section 111 based on image data, and a distance between both detected positions is obtained.

After that, it is determined whether or not L is larger than R (S105). Here, a distance L between the lateral canthus and the medial canthus of the left eye and a distance R between the lateral canthus and the medial canthus of the right eye, that were obtained in step S101, are compared. If the result of this determination is that L is larger than R, an eye AF frame of the left eye, from the observer's viewpoint, is selected (S107). On the other hand, if the result of determination is that L is not larger than R, an eye AF frame of the right eye, from the observer's viewpoint, is selected (S109).

Figure 10A:
FIG. 10A and FIG. 10B are drawings for describing the manner in which eye AF frames are selected, with the camera of one embodiment of the present invention.
Figure 10B:

With the example shown in FIG. 10A, since the distance 201R between the lateral canthus and the medial canthus of the right eye is larger than the distance 201L between the lateral canthus and the medial canthus of the left eye, the eye AF frame of the right eye, from the observer's viewpoint, is selected. Also, with the example shown in FIG. 10B, since the distance 202R between the lateral canthus and the medial canthus of the right eye and the distance 202L between the lateral canthus and the medial canthus of the left eye are substantially equal, the determination in step S105 becomes No, and the AF frame of the right eye, from the observer's viewpoint, is selected.

In the one embodiment, in the event that both distances are substantially equal, the right eye AF frame is selected, but since there is no significant difference which eye is selected it is also possible to select the left eye AF frame. Further, although not shown in the drawings it is also possible to select AF frames for both left and right eyes, and to carry out focus using results of distance measurement calculation for both AF frames. Once an AF frame has been selected in step S107 or step S109, the originating flow is returned to In this way, in the flow for eye AF frame selection of the one embodiment, detection of facial organs is utilized and an AF frame is selected using a distance between the lateral canthus and medial canthus. In facial detection, it is common practice to utilize a function of detecting organs within the face, such as eyes, nose or mouth. Therefore, in this flow also, since it is possible to directly use information on the lateral canthus and medial canthus that was detected at the time of eye detection, rapid processing becomes possible. Also, since an eye with the longest distance between the lateral canthus and medial canthus is generally at a closer distance, it is possible to easily detect an eye that is closest to the camera.

Next, the first modified example of the eye AF frame selection of step S43 of the main flow shown in FIG. 3 to FIG. 5 will be described using FIG. 11 and FIG. 12. In the flow for eye AF frame selection of the one embodiment, a distance between the lateral canthus and medial canthus was adopted in calculating the size of the eye. In this modified example, pupil diameter is adopted in calculating the size of the eye.

Figure 11:
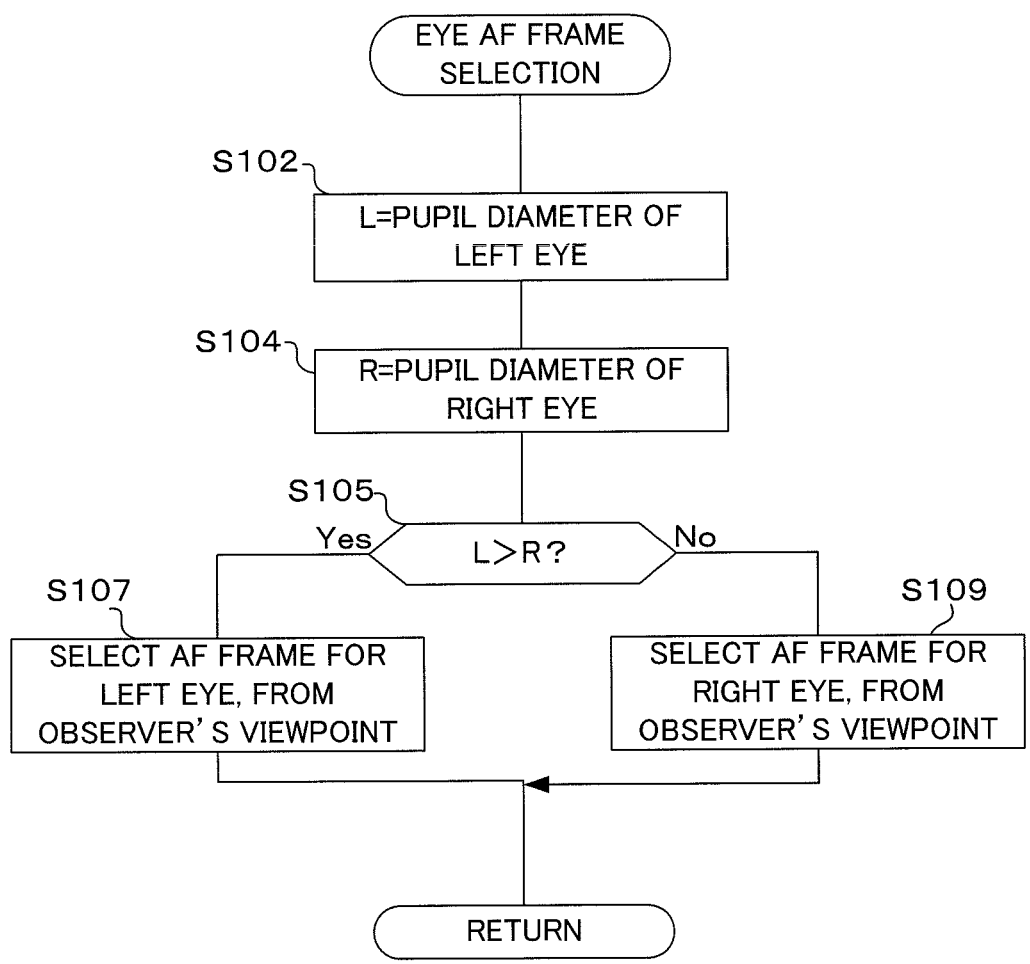
FIG. 11 is a flowchart showing a first modified example of an eye AF frame selection operation of the camera of one embodiment of the present invention.

Comparing the flow shown in FIG. 11 for the first modified examples of eye AF frame selection and the flow shown in FIG. 9 for the one embodiment, there is a difference in that steps S101 and S103 of the one embodiment have been replaced with steps S102 and S104. Accordingly, description will center on these points of difference, and steps carrying out the same processing have the same reference numbers attached, and detailed description thereof is omitted.

If the eye AF frame selection flow shown in FIG. 11 is entered, first of all a pupil diameter of the left eye, from the observer's viewpoint, is set to L (S102), while the distance between the pupil diameter of the right eye, from the observer's viewpoint, is set to R (S104). Here, the image processing section 111 detects positions of the pupils of respective eyes based on image data, and obtains the diameter of the detected pupils. Once pupil diameter has been detected in steps S102 and S104, selection of an AF frame is carried out in steps S105 and afterwards, similarly to the flow of FIG. 9.

Figure 12A:
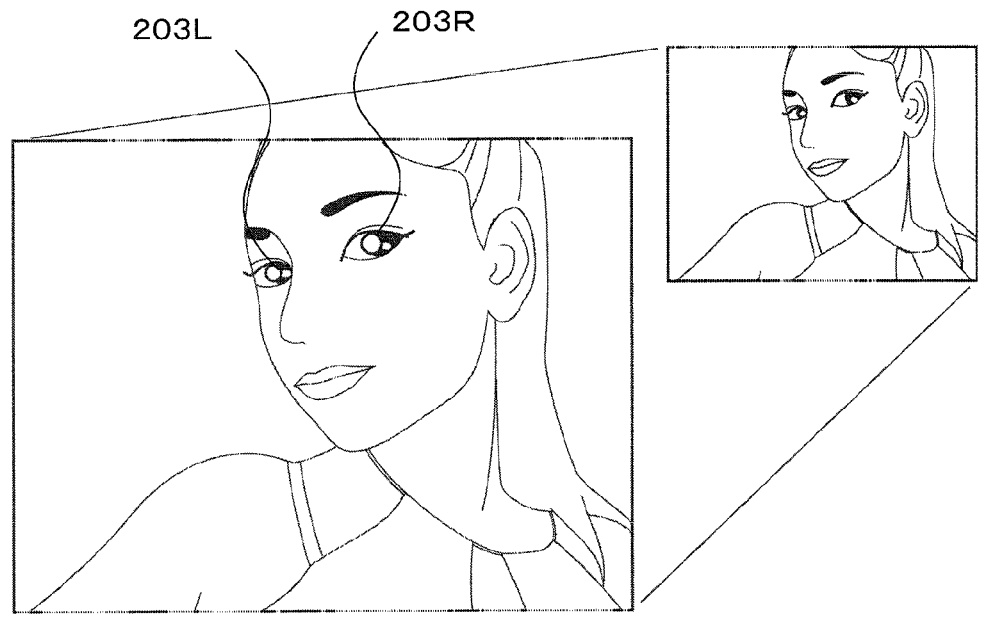
FIG. 12 is a drawing for describing a first modified example of the manner in which eye AF frames are selected, with the camera of one embodiment of the present invention.
Figure 12B:

With the example shown in FIG. 12A, since the pupil diameter 203R of the right eye is larger than the pupil diameter 203L of the left eye, the eye AF frame of the right eye, from the observer's viewpoint, is selected. Also, with the example shown in FIG. 12B, since the pupil diameter 204R of the right eye and the pupil diameter 204 of the left eye are substantially equal, the determination in step S105 becomes No, and the AF frame of the right eye, from the observer's viewpoint, is selected. In this embodiment also, in the event that both pupil diameters are substantially equal, the right eye AF frame is selected, but since there is no significant difference no matter which eye is selected it is also possible to select the left eye AF frame. Once an AF frame has been selected in step S107 or step S109, the originating flow is returned to In this way, in the flow for eye AF frame selection of the first modified example also, detection of facial organs is utilized and an AF frame is selected using size of pupil diameter. Therefore, since information about a pupil that was detected at the time of eye detection can be used directly, rapid processing becomes possible. Also, since the eye having the largest pupil diameter is generally at a closer distance, it is possible to easily detect an eye that is closer to the camera.

Next, a second modified example of the eye AF frame selection of step S43 of the main flow shown in FIG. 3 to FIG. 5 will be described using FIG. 13 and FIG. 14. In the flow for eye AF frame selection of the one embodiment, a distance between the lateral canthus and medial canthus was adopted in selecting either the left eye or right eye. With this modified example, turning of the face is first detected and either a left or right eye AF frame is selected in accordance with the face turning, and in the event that the face is turned through a specified angle or more, eye AF frame is selected using the distance between the lateral canthus and medial canthus.

Figure 13:
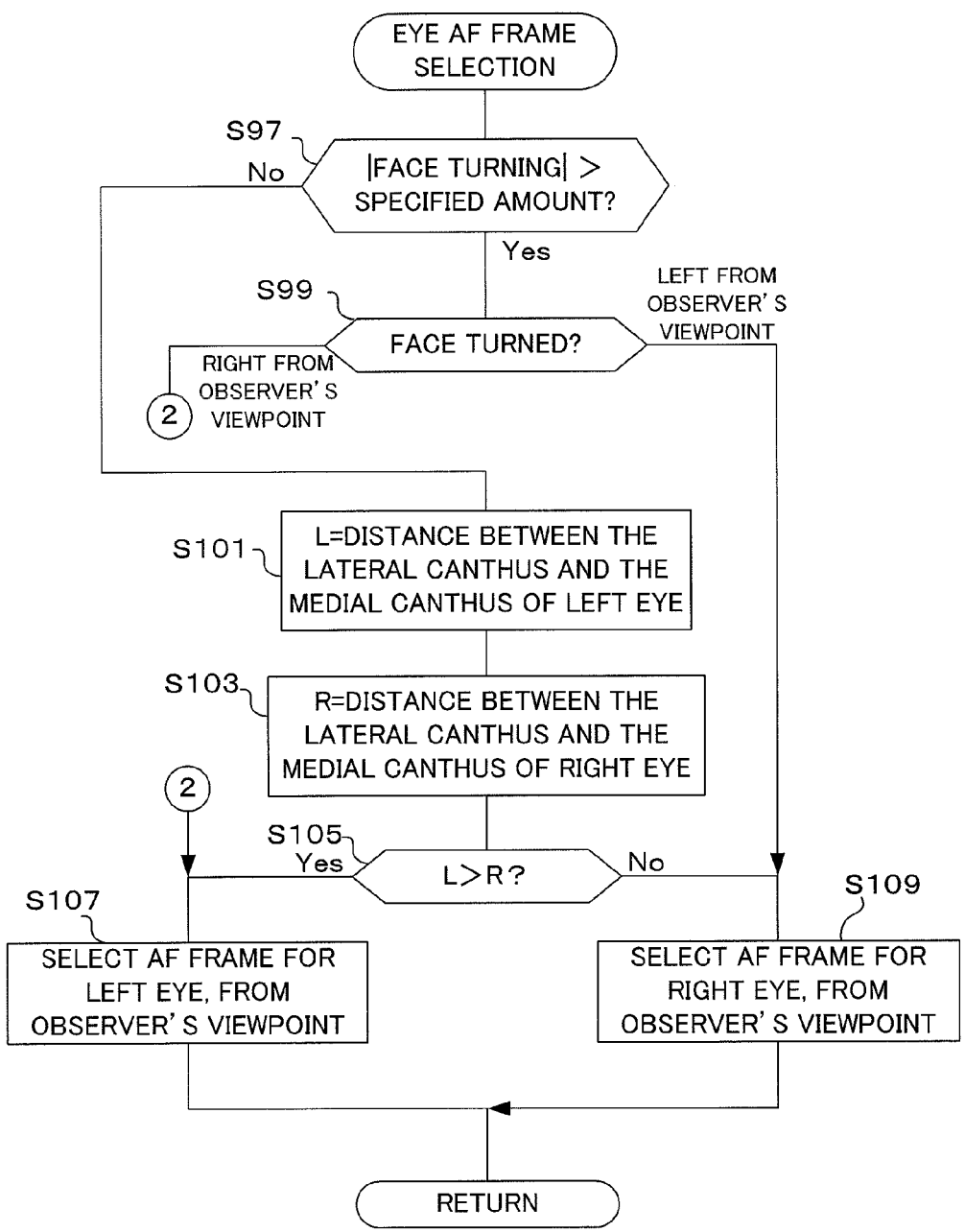
FIG. 13 is a flowchart showing a second modified example of an eye AF frame selection operation of the camera of one embodiment of the present invention.

Comparing the flow shown in FIG. 13 for the second modified example and the flow shown in FIG. 9 for the one embodiment, there is a difference in that steps S97 and S99 are added in the second modified example. Accordingly, description will center on these points of difference, and steps carrying out the same processing have the same reference numbers attached, and detailed description thereof is omitted.

If the eye AF frame selection flow shown in FIG. 13 is entered, it is first determined whether or not an absolute value of face turning angle is larger than a specified amount (S97). Here, the image processing section 111 detects points such as eyes, mouth, nose, chin, forehead, eyebrows, brow, etc. forms a wireframe connecting these points, as shown in FIG. 14, and calculates an angle for the direction in which the face is facing based on this wireframe. As a specified amount when determining face turning, it is possible to use 16° for example, as in the case of S33 in FIG. 5.

If the result of determination in step S97 is that the turning of the face is greater than the specified amount, it is next determined whether the face is turned to the left or to the right (S99). If the result of this determination is that the face is turned to the right, an eye AF frame of the left eye, from the observer's viewpoint, is selected (S107). Since a person who is the subject is turned to the right, from the observer's viewpoint, the left eye is facing towards the camera and for this reason the left eye AF frame is selected. On the other hand, if the result of determination is that the face is turned to the left, an eye AF frame of the right eye, from the observer's viewpoint, is selected (S109). Since a person who is the subject is turned to the left, from the observer's viewpoint, the right eye is facing towards the camera and for this reason the right eye AF frame is selected.

Figure 14A:
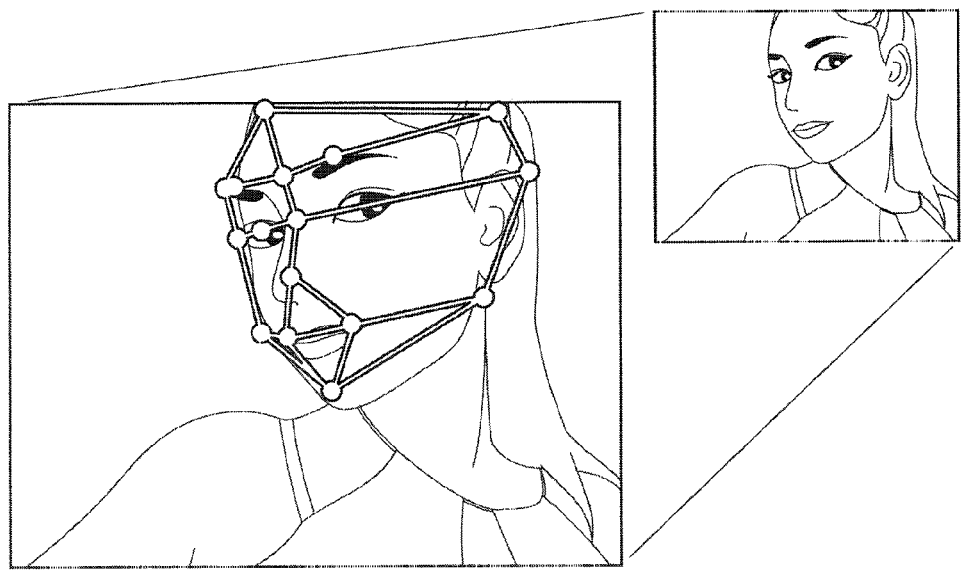
FIG. 14A and FIG. 14B are drawings for describing a second modified example of the manner in which eye AF frames are selected, with the camera of one embodiment of the present invention.
Figure 14B:
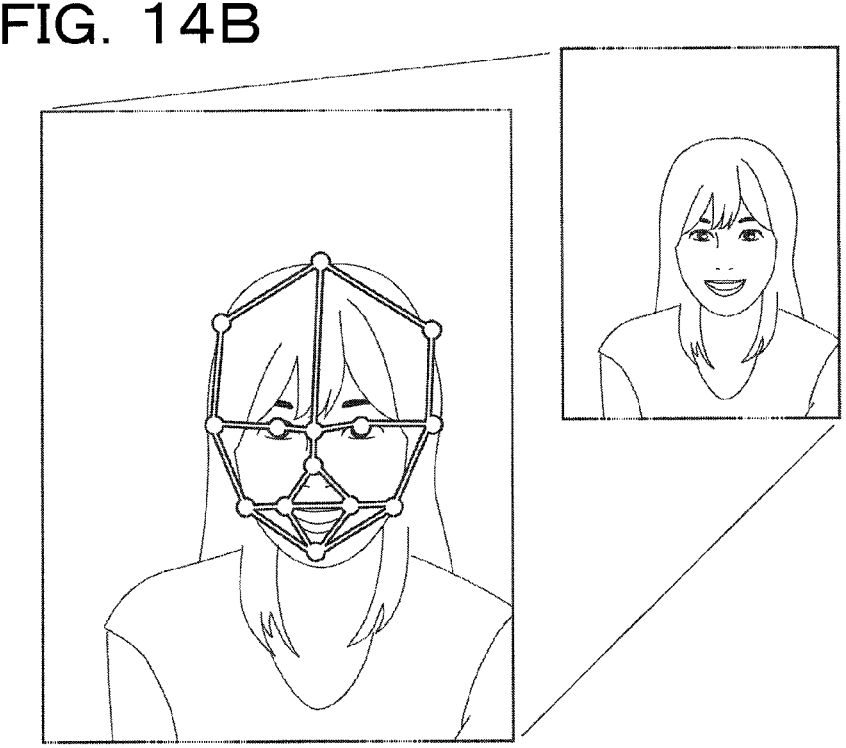

When determining whether the face is turned to the right or to the left, with the example shown in FIG. 14A a centerline passing through the forehead, eyebrows, nose and chin is off-center to the left with respect to a line for the shape of the face, and so turning to the left is determined, and it is possible to calculate an angle based on how the centerline is offset. Also, with the example shown in FIG. 14B a centerline passing through the forehead, eyebrows, nose and chin is substantially in the middle with respect to a line for the shape of the face, and so it is determined that the subject is face-on.

If the result of determination in step S97 is that face turning is less than or equal to the specified amount, then similarly to the case of the one embodiment, a distance between the lateral canthus and medial canthus is detected, and the side of the largest eye is selected as an AF frame (S101-S109). Once an AF frame has been selected in step S107 or step S109, the originating flow is returned to. It is also perfectly acceptable to replace steps S101 and S103 with steps S102 and S104 of the first modified example of eye AF frame selection.

In this way, in the flow for eye AF frame selection of the second modified example also, detection of facial organs is utilized and face turning is calculated to select an AF frame. Therefore, since it is possible to directly use information on the facial organs that was detected at the time of face detection, rapid processing becomes possible. In particular, in this modified example since face turning is determined using a wire frame, detection is possible even with a slight angle and it is possible to carry out highly precise focusing. Also, since an eye at a closer distance is selected in accordance with face turning, it is possible to easily detect an eye that is closer to the camera.

Next, a third modified example of the eye AF frame selection of step S43 of the main flow shown in FIG. 3 to FIG. 5 will be described using FIG. 15 and FIG. 16. With this modified example, positions of the right eye and the left eye from a center screen position are detected, and either a left or right eye AF frame is selected in accordance with the detected positions.

Figure 15:
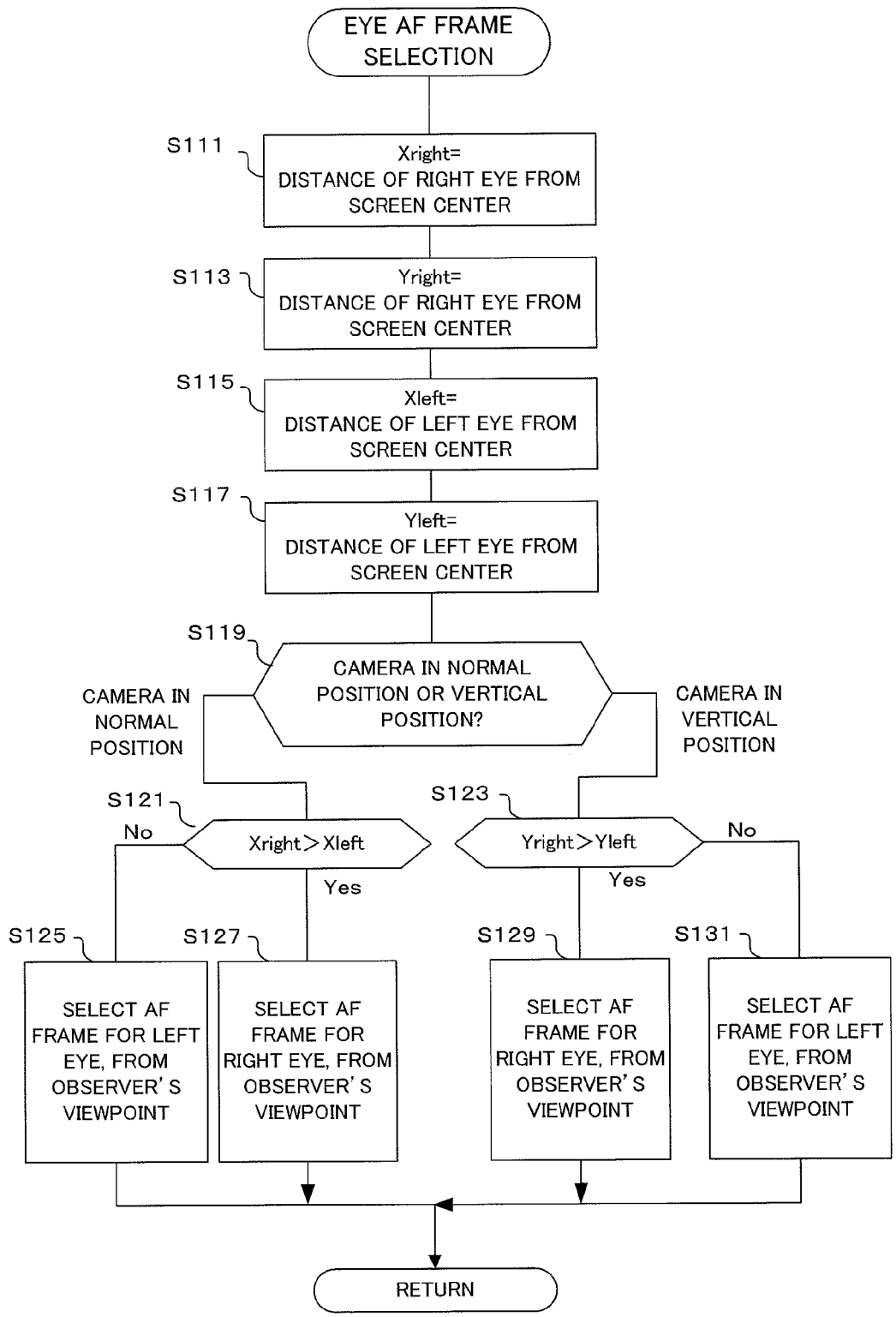
FIG. 15 is a flowchart showing a third modified example of an eye AF frame selection operation of the camera of one embodiment of the present invention.
Figure 16:
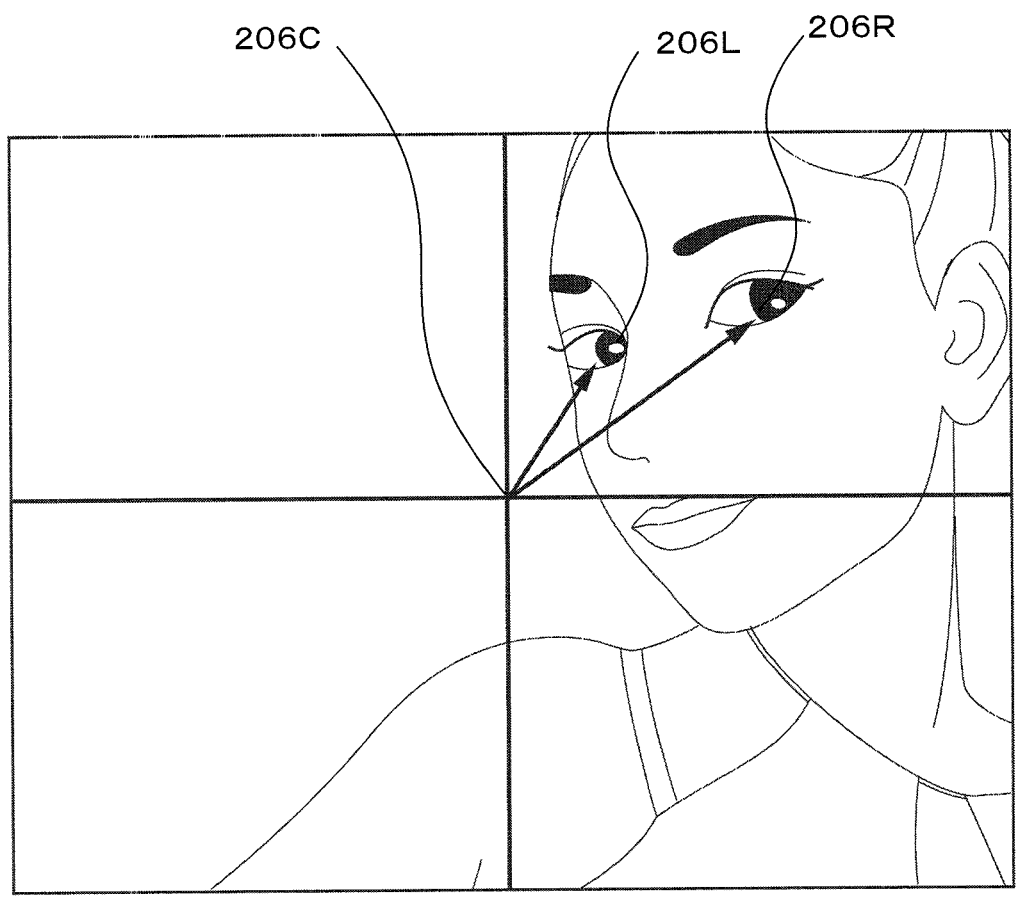
FIG. 16 is a drawing for describing a third modified example of the manner in which eye AF frames are selected, with the camera of one embodiment of the present invention.

If the flow for eye AF frame selection shown in FIG. 15 is entered, first of all a distance of the right eye from the screen center along the x axis direction is made Xright (S111), and a distance of the right eye from the screen center along the Y axis direction is made Yright (S113). Here, the image processing section 111 determines the screen center position 206C based on image data, and determines the position of the right eye, for example, an x-coordinate and y-coordinate (Xright, Yright) of the pupil, with this center position 206c as a datum.

Next, a distance of the left eye from the screen center along the x axis direction is made Xleft (S115), and a distance of the left eye from the screen center along the Y axis direction is made Yleft (S117). Here, the image processing section 111 determines the position of the left eye, for example an x-coordinate and y-coordinate (Xleft, Yleft) of the pupil with this center position 206c as a datum.

Once coordinates of the right eye and the left eye have been determined in steps S111 to S117, it is next determined whether the camera is at a normal position or a vertical position (S119). Here, whether the camera is in a normal position (lateral position) or vertical position is determined based on an attitude sensing section (not shown) of the camera such as a six-axis sensor or a gyro.

If the result of determination in step S119 is that the camera is in the normal position (lateral position), it is next determined whether the value of the x coordinate of the right eye is larger than the value of the x coordinate of the left eye (S121). If the camera is in the normal position, the eye that has an x-coordinate furthest from the screen center 206c is selected.

If the result of determination in step S121 is that the value of the x-coordinate of the right eye is not larger than the value of the x-coordinate of the left eye, the left eye AF frame, from the observer's point of view, is selected (S125). On the other hand, if the value of the x-coordinate of the right eye (Xright) is larger than the value of the x-coordinate of the left eye (Xleft), the right eye AF frame, from the observer's point of view, is selected (S127). With the example shown in FIG. 16, since the x-coordinate of the right eye position 206R is largest, a right eye AF frame is selected.

On the other hand, if the result of determination in step S119 is that the camera is in the vertical position, it is next determined whether the value of the y-coordinate of the right eye (Yright) is larger than the value of the y-coordinate of the left eye (Yleft) (S123). If the camera is in the vertical position, the eye that has a y-coordinate furthest from the screen center 206c is selected.

If the result of determination in step S123 is that the value of the y-coordinate of the right eye is not larger than the value of the y-coordinate of the left eye, the left eye AF frame, from the observer's point of view, is selected (S131). On the other hand, if the value of the y-coordinate of the right eye is larger than the value of the y-coordinate of the left eye, the right eye AF frame, from the observer's point of view, is selected (S129). The example shown in FIG. 16 is in the lateral position, but if it were conversely made the vertical position, the y-coordinate of the right eye position 206R is largest, and so the right eye AF frame is selected. Once an AF frame has been selected in steps S125-S131, the originating flow is returned to.

In this way, in the flow for eye AF frame selection of the third modified example also, detection of facial organs is utilized and face turning is calculated to select an AF frame. Therefore, since it is possible to directly use information on the facial organs that was detected at the time of face detection, rapid processing becomes possible. In particular, with this modified example, since an AF frame is selected based on a distance from the screen center to an eye, it is possible to carry out processing in almost no time. Also, since an eye at a closer distance is selected in accordance with face turning, it is possible to easily detect an eye that is closer to the camera.

Next, a fourth modified example of the eye AF frame selection of step S43 of the main flow shown in FIG. 3 to FIG. 5 will be described using FIG. 17 and FIG. 18. In the one embodiment and the first to third modified examples of eye AF frame selection, and AF frame was automatically selected from either the left or right eye. However, since there are also cases where the user wishes to select an AF frame for either the left or right eye in advance, in this modified example is made possible to set an eye AF frame on the right eye or the left eye in advance.

Figure 17:
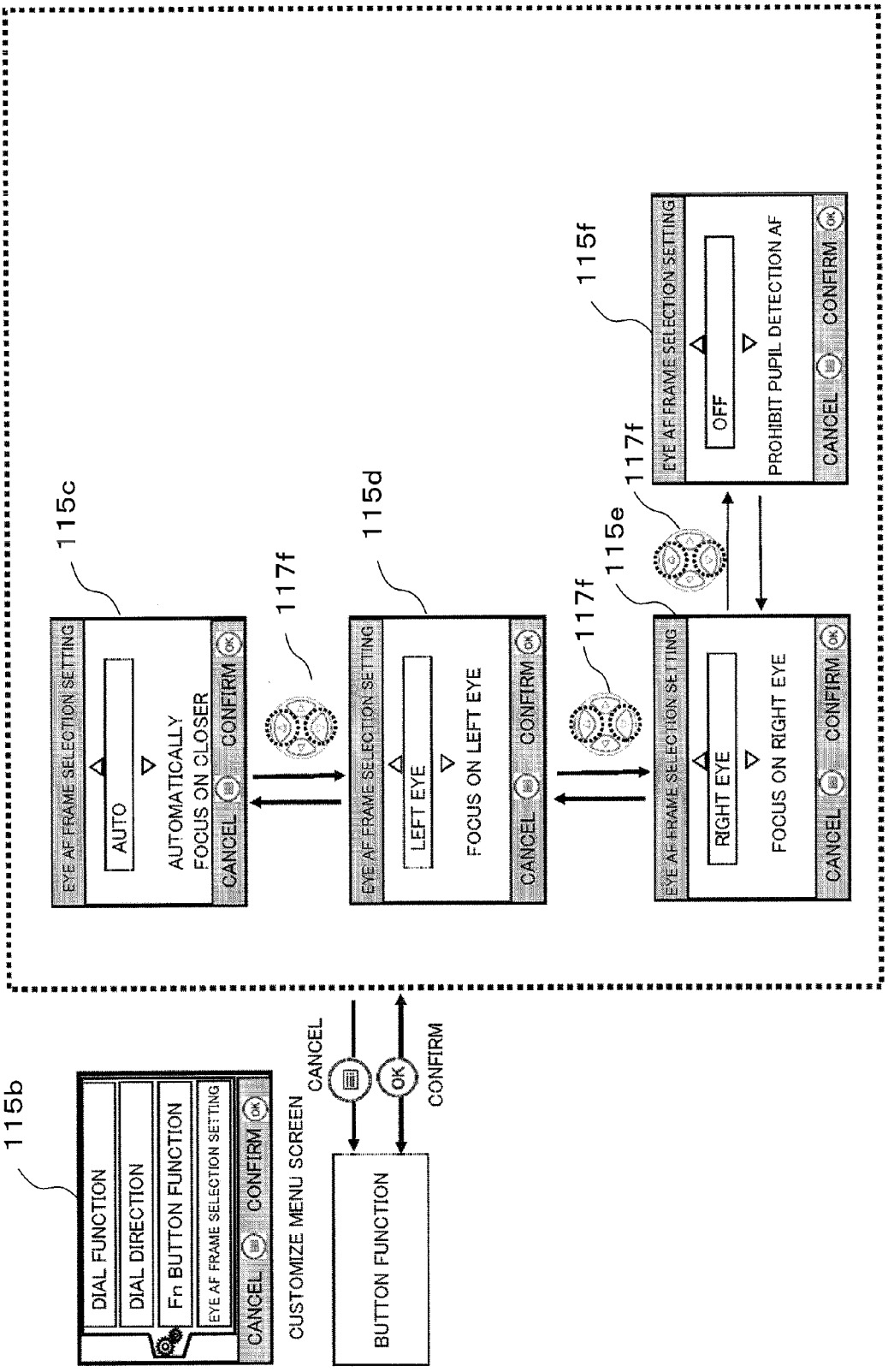
FIG. 17 is a flowchart showing a fourth modified example of an eye AF frame selection operation of the camera of one embodiment of the present invention.
Figure 18:
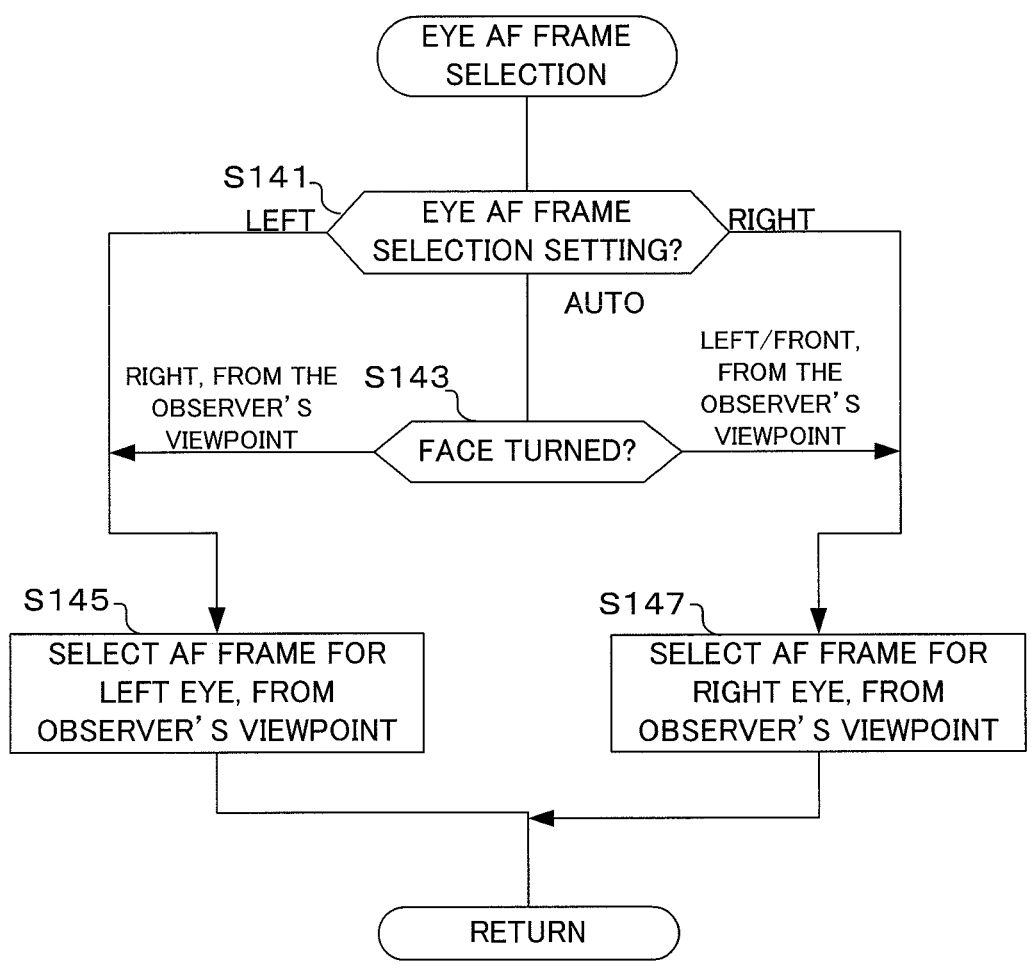
FIG. 18 is a flowchart showing a fourth modified example of an eye AF frame selection operation of the camera of one embodiment of the present invention.

A manual setting screen for eye AF frame is shown in FIG. 17. If the user operates a menu button (not shown) and opens a customized menu screen 115b from the menu screen, it is possible to select a function button (Fn button) function, and an eye AF frame selection setting icon is provided below this Fn button function.

If the cross key button 117f is operated, eye AF frame selection setting selected, and this setting confirmed with the OK button 117g, an automatic setting screen 115c showing an AUTO icon within eye AF frame selection setting is displayed. In this state automatic mode for eye AF frame is set by operating the OK button 117g. If this eye AF frame auto mode is set, an eye AF frame is automatically set in accordance with one of the one embodiment or the first to third modified examples.

In the state of displaying the automatic setting screen 115c, it is possible to cause display of a left eye setting screen 115d by operating up and down keys on the cross key button 117f, and by operating the OK button 117g in this state left eye AF frame setting mode is set. When this mode has been set, if the eye AF frame selection flow is entered the left eye of a person is detected, and an eye AF frame is automatically set on the left eye.

In the state of displaying the left eye setting screen 115c, it is possible to cause display of a right eye setting screen 115e by operating up and down keys on the cross key button 117f, and by operating the OK button 117g in this state right eye AF frame setting mode is set. When this mode has been set, if the eye AF frame selection flow is entered the right eye of a person is detected, and an eye AF frame is automatically set on the right eye.

In the state of displaying the right eye setting screen 115e it is possible to cause display of an off setting screen 115f by operating up and down keys on the cross key button 117f, and by operating the OK button 117g in this state eye AF frame off mode is set. If this mode is set, eye AF frame setting is inhibited, and normal AF is set. An instruction section for instructing to focus on one of either the left or right eye, or to automatically select the largest eye, is constituted by the above-described operation section 117, such as the cross key button 117f, the display section 115 and the system control section 116.

Next, eye AF frame selection in accordance with an eye AF frame setting mode that has been set as described above will be described using FIG. 18. If the eye AF frame selection flow shown in FIG. 18 is entered, determination is first carried out for eye AF selection setting (S141). Here, as was described using FIG. 17, it is determined whether AUTO mode, right eye AF frame setting mode, or left eye AF frame setting mode is set.

If the result of determination in step S141 is that left eye AF setting mode has been selected, a left eye AF frame, for the observer's viewpoint, is selected (S145). On the other hand, if right eye AF setting mode has been selected, a right eye AF frame, for the observer's viewpoint, is selected (S147).

If the result of determination in step S141 is that auto mode has been selected, face turning is selected (S143). For face turning detection, it is preferable to perform detection based on a face wireframe, such as was described in steps S97 and S99 of FIG. 13 for the second modified example.

If the result of determination in step S143 is that the face is turned to the right, from the observer's viewpoint, a right eye AF frame, from the observer's viewpoint, is selected (S145). On the other and, if the face is turned to the left, from the observer's viewpoint, a right eye AF frame, from the observer's viewpoint, is selected (S147). Once an AF frame has been selected in step S145 or step S147, the originating flow is returned to In this way, with the fourth modified example of eye AF frame selection it is possible for the user to set the eye AF frame in advance to either the left or right eye as desired. It is therefore possible to take photographs focused on an eye in line with the user's intention. In step S143, an example adopting the second modified example was described for detection of face turning, but this is not limiting, and it is also possible to adopt the one embodiment or another modified example.

Next, a fifth modified example of the eye AF frame selection of step S43 of the main flow shown in FIG. 3 to FIG. 5 will be described using FIG. 19 and FIG. 20. With this modified example, when the photographing lens 101 is scanned in order to carry out face-priority AF, if it becomes clear that the right eye or the left eye is closer than the entire face, the closest eye is selected as an eye AF frame.

Figure 19:
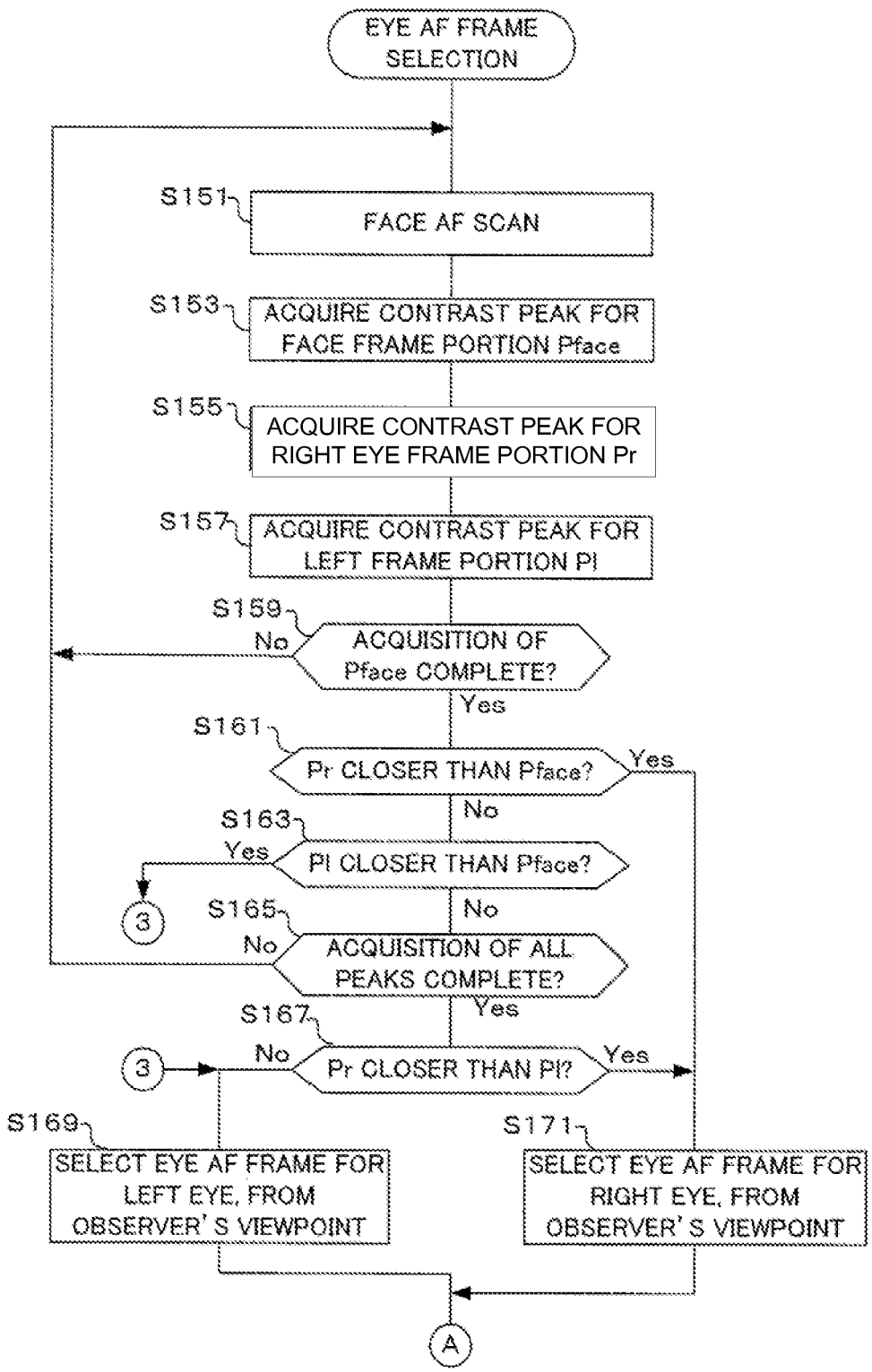
FIG. 19 is a flowchart showing a fifth modified example of an eye AF frame selection operation of the camera of one embodiment of the present invention.

If the eye AF frame selection flow shown in FIG. 19 is entered, face-priority AF scanning is first carried out (S151). This face-priority AF scanning detects area of the entire face, area of the right eye and area of the left eye using predetermined face detection, and in this state acquires a contrast value from image data for every area while moving the photographing lens 101 from the close-up end to the infinity end.

Once face-priority AF commences, during movement of the photographing lens 101 contrast peak Pface for a face frame portion is obtained (S153), a contrast peak Pr for a right eye frame portion is obtained (S155), and the contrast peak Pl for a left eye frame portion is obtained (S157). While moving the photographing lens 101, it is possible to obtain the graph relationships as shown in FIG. 20B by acquiring contrast values.

Figure 20A:
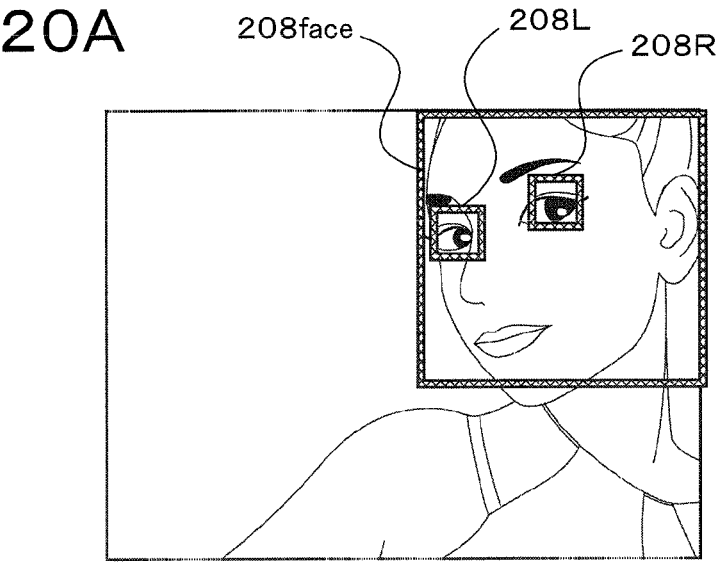
FIGS. 20A and 20B are drawings for describing a fifth modified example of the manner in which eye AF frames are selected, with the camera of one embodiment of the present invention.
Figure 20B:
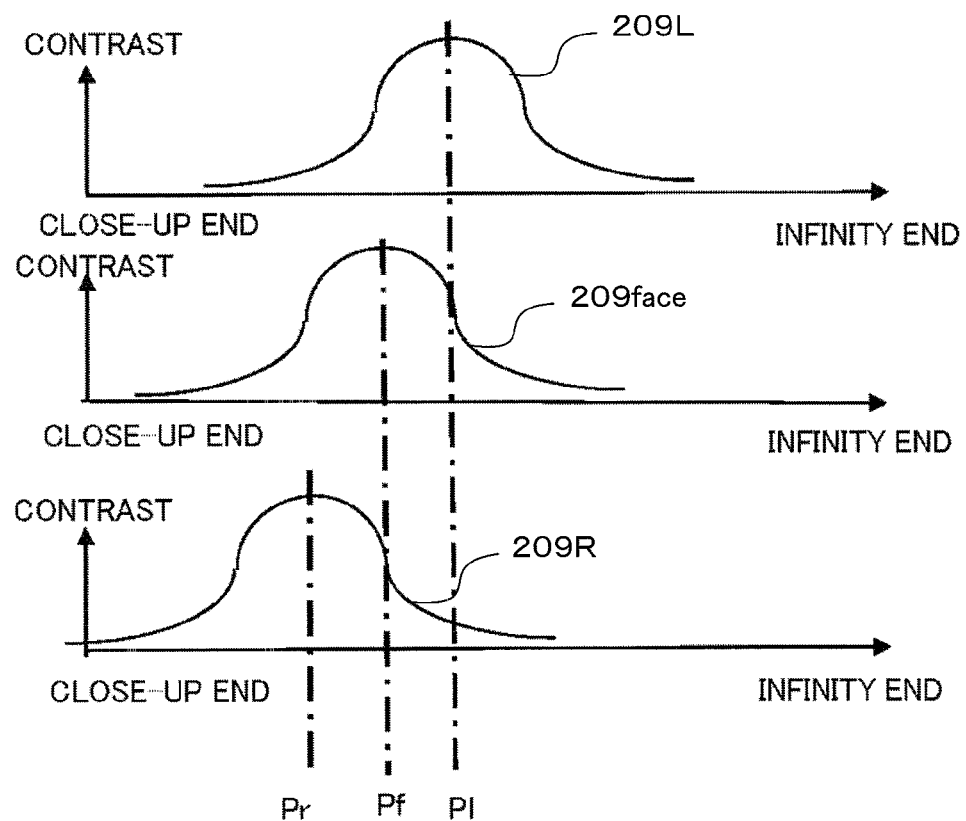

Specifically, in a case where a person such as shown in FIG. 20A is made the subject, a face frame 208face, right eye frame 208R and the left eye frame 208L are detected in advance of face-priority AF scanning. While moving the photographing lens 101 in this state, if the AF processing section 113 obtains a contrast value for each frame based on image data, it is possible to obtain the contrast curves 209L, 209face and 209R as shown in FIG. 20B. Within these contrast curves, respective peak positions are set. Specifically, a face frame portion peak is made Pface, a right eye frame portion peak is made Pr, and the left eye frame portion peak is made Pl.

Next it is determined whether or not acquisition of Pface for the face frame portion has been completed (S159). Contrast for the face frame portion 209face gradually increases, and then decreases once Pface has been passed, with the movement of the photographing lens 101 from the close-up end to the infinity end, and so it is possible to obtain Pface once contrast value reduces. If the result of this determination is that acquisition of Pface is not complete, processing returns to step S151, and a contrast peak is obtained while continuing face-priority AF scanning.

If the result of determination in step S159 is that Pface has been acquired, it is next determined whether or not the contrast peak Pr for the right eye frame 208R is further towards the close-up end than Pface (S161). If the result of this determination is that Pr is closer to the close-up end than Pface, an eye AF frame is selected on the right eye, from the observer's viewpoint (S171).

If the result of determination in step S161 is that Pr Is not closer to the close-up end than Pface, it is next determined whether or not the contrast peak Pl for the left eye frame 208L is further towards the close up end than Pface (S163). If the result of this determination is that Pl is closer to the close-up end than Pface, an eye AF frame is selected on the left eye, from the observer's viewpoint (S169).

If the result of determination in step S163 is that Pl Is not closer to the close-up end than Pface, it is next determined whether or not all peaks have been acquired (S165). Here, it is determined whether or not all of the peaks Pface, Pr and Pl have been acquired. If the result of this determination is that acquisition of all peaks is not complete, processing returns to step S151, and acquisition of peaks continues.

On the other hand, if the result of determination in step S165 is that acquisition of all peaks has been completed, it is next determined whether or not Pr is closer to the close-up end than Pl. If the result of this determination is that Pr is closer to the close-up end than Pl, an eye AF frame is selected on the right eye, from the observer's viewpoint (S171). On the other hand, if the result of determination is that Pr is not closer to the close-up end than Pl, an eye AF frame is selected on the left eye, from the observer's viewpoint (S169). Once an eye AF frame has been selected in step S169 or S171, contrast AF of step S47 is skipped, and processing jumps to step S49.

In this way, with the fifth modified example of eye AF frame selection, at the point in time where contrast values for the entire face have been acquired a peak position for the contrast value of the entire face is compared with a peak position for the contrast value of the right eye frame or the left eye frame, and the right eye frame or the left eye frame that is at the close-up end is selected as the eye AF frame. It is therefore possible to select an eye AF frame before completion of face-priority AF scanning, and it becomes possible to perform eye AF rapidly.

As has been described above, with the one embodiment and the modified examples of the present invention, the most appropriate eye or face is selected and an AF region set based on position and size of an eye within the face, or a face. It is therefore made possible to achieve good focus on an eye regardless of the size or position of a person being photographed.

With each of the embodiment and modified examples of the present invention, a device for taking pictures has been described using a digital camera, but as a camera it is also possible to use a digital single lens reflex camera or a compact digital camera, or a camera for movie use such as a video camera, and further to have a camera that is incorporated into a mobile phone, a mobile information terminal (PDA: Personal Digital Assistant), game console etc.

Also, regarding the operation flow in the patent claims, the specification and the drawings, for the sake of convenience description has been given using words representing sequence, such as "first" and "next", but this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device capable of taking digital images, comprising:
   a facial organ detection section for detecting facial organs including eyes within a face from an image that has been taken by an imaging section;
   an eye selection section for comparing sizes of eyes detected by the facial organ detection section and selecting the largest eye;
   an eye size comparative determination section for comparing the size of the eye that has been selected by the eye selection section with a specified value;
   an AF region setting section for setting an AF region in accordance with size and position of the selected eye when it has been determined by the eye size comparative determination section that the size of the eye is larger than the specified value, and setting an AF region in accordance with position and size of a face to which the selected eye belongs when it has been determined that the size of the eye is smaller than the specified value; and
   an AF processing section for carrying out an AF operation based on the AF region set by the AF region setting section, wherein the specified value is set to a value such that focus is varied in a distance range of a depth of a face.

2. The imaging device of claim 1, wherein the eye selection section detects a value corresponding to a distance between the lateral canthus and the medial canthus as a size of an eye, and selects the largest eye by comparing sizes of a plurality of eyes based on the distance between the lateral canthus and the medial canthus.

3. The imaging device of claim 1, wherein the eye selection section detects a value corresponding to pupil diameter as a size of an eye, and selects the largest eye by comparing sizes of a plurality of eyes based on pupil diameter.

4. The imaging device of claim 1, wherein the AF region settings section detects turning of a face if it has been determined, by the eye size comparative determination section, that the size of an eye is larger than the specified value, and selects one eye from the left eye and the right eye based on the detected face turning, and sets an AF region based on the position and size of the selected eye.

5. The imaging device of claim 1, wherein the AF region settings section, if it has been determined, by the eye size comparative determination section, that the size of an eye is larger than the specified value, selects an eye that is closest to a screen center, of the detected left eye and the right eye, and sets an AF region based on the position and size of the selected eye.

6. The imaging device of claim 1, further comprising:
a display section for displaying the position of an eye that has been focused on by the AF processing section; and
a switch section for instructing to switch between an eye displayed by the display section and an opposite eye, wherein
the AF region setting section changes in AF region to an opposite eye in response to an instruction of the switch section, and the AF processing section carries out AF operation based on an AF region set by the AF region setting section.

7. An AF control method for an imaging device having an imaging section that is capable of taking digital images, comprising:
detecting eyes within a face from an image that has been formed by the imaging section, and selecting a largest eye by comparing sizes of a plurality of detected eyes;
comparing size of a selected eye having the largest size with a specified value;
when it has been determined that the size of the eye is larger than a specified value, setting an AF region in accordance with size and position of the selected eye; and
when it has been determined that the size of the eye is smaller than the specified value, setting an AF region in accordance with position and size of a face to which the selected eye belongs, and carrying out an AF operation based on the set AF region,
wherein the specified value is set to a value such that focus is varied in a distance range of a depth of a face.

8. An imaging device capable of taking digital images, comprising:
a facial organ detection section for detecting facial organs, including eyes, within a face from an image that has been taken by an imaging section;
an eye selection section for comparing sizes of eyes detected by the facial organ detection section and selecting the largest one of the eyes that have been detected by the facial organ detection section;
an eye size comparative determination section for comparing the size of the eye that has been selected by the eye selection section with a specified value;
an autofocus region setting section for setting an autofocus region in accordance with a size and a position of the selected eye responsive to a determination by the eye size comparative determination section that the size of the selected eye is larger than the specified value, and setting an autofocus region in
accordance with a position and a size of the face to which the selected eye belongs responsive to a determination by the eye size comparative determination section that the size of the selected eye is smaller than the specified value;
an AF processing section for carrying out an autofocus operation based on the autofocus region set by the autofocus region setting section; and
a system control section for controlling still picture shooting after the autofocus operation is carried out by the AF processing section and for controlling storage of an image resulting from the still picture shooting,
wherein the specified value is set to a value such that focus is varied in a distance range of a depth of a face.

* * * * *